June 27, 1944.    H. CAREW    2,352,369
CONTAINER MAKING MACHINE
Filed Aug. 12, 1938    15 Sheets-Sheet 1
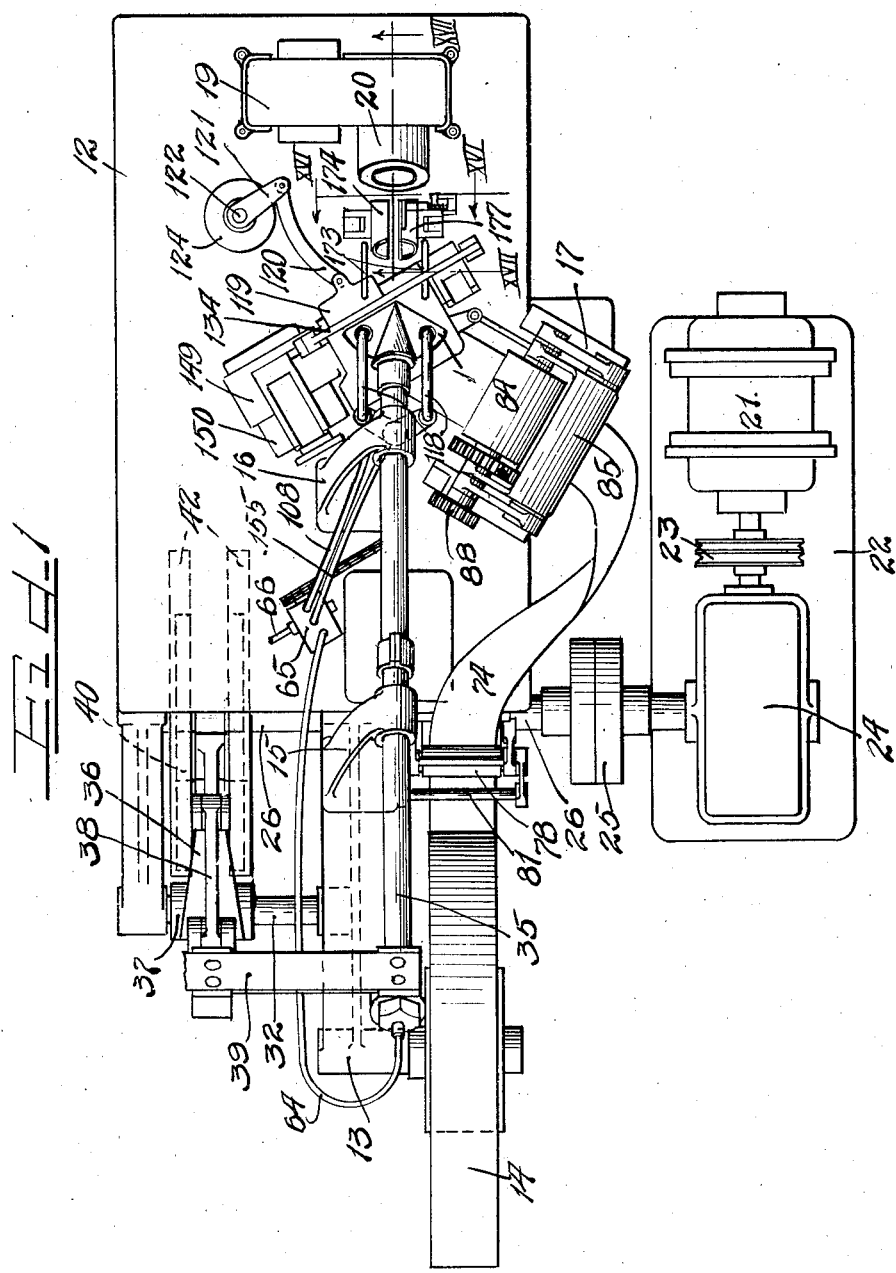
INVENTOR
Herman Carew.
by Charles H. Hill
ATTYS.

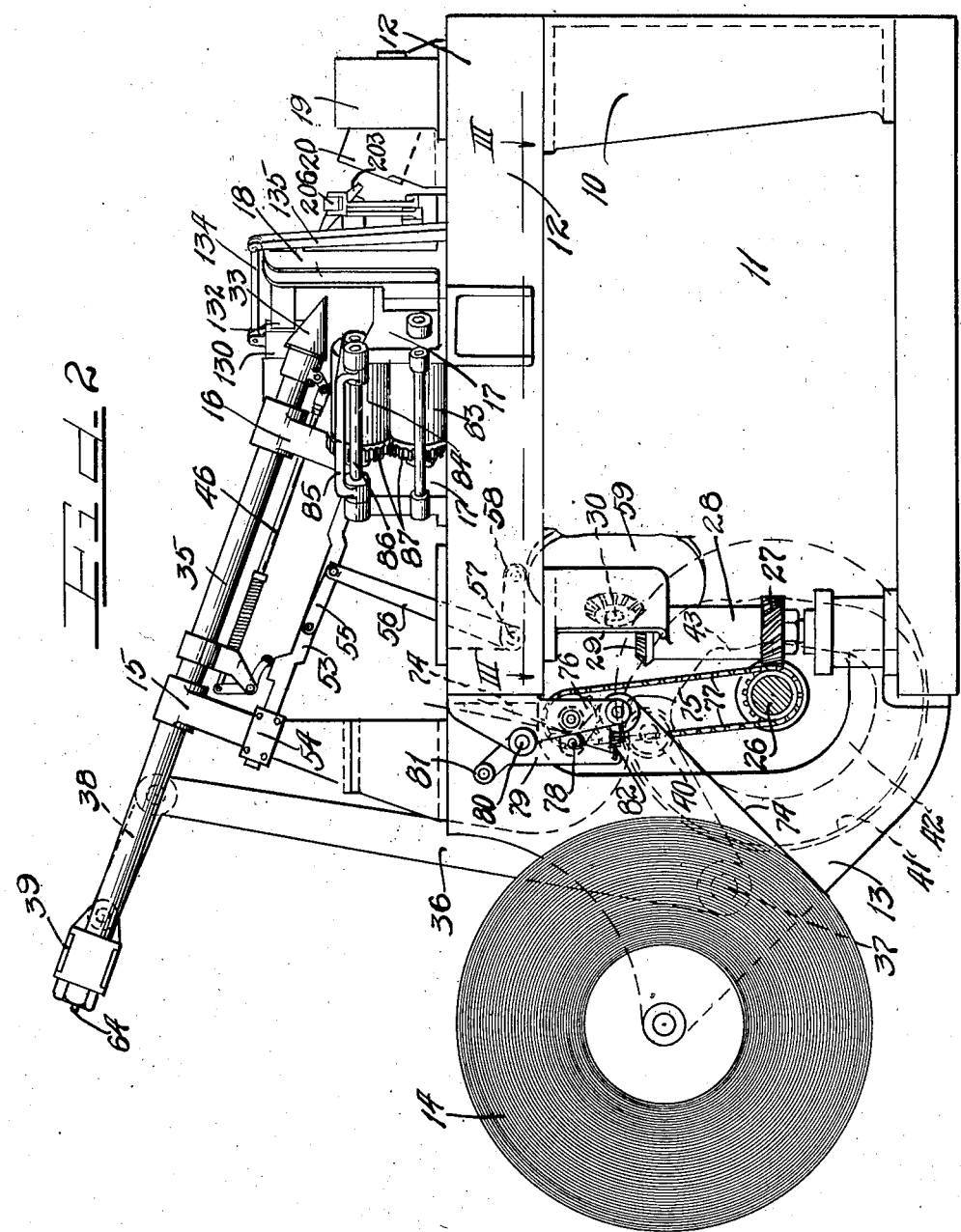

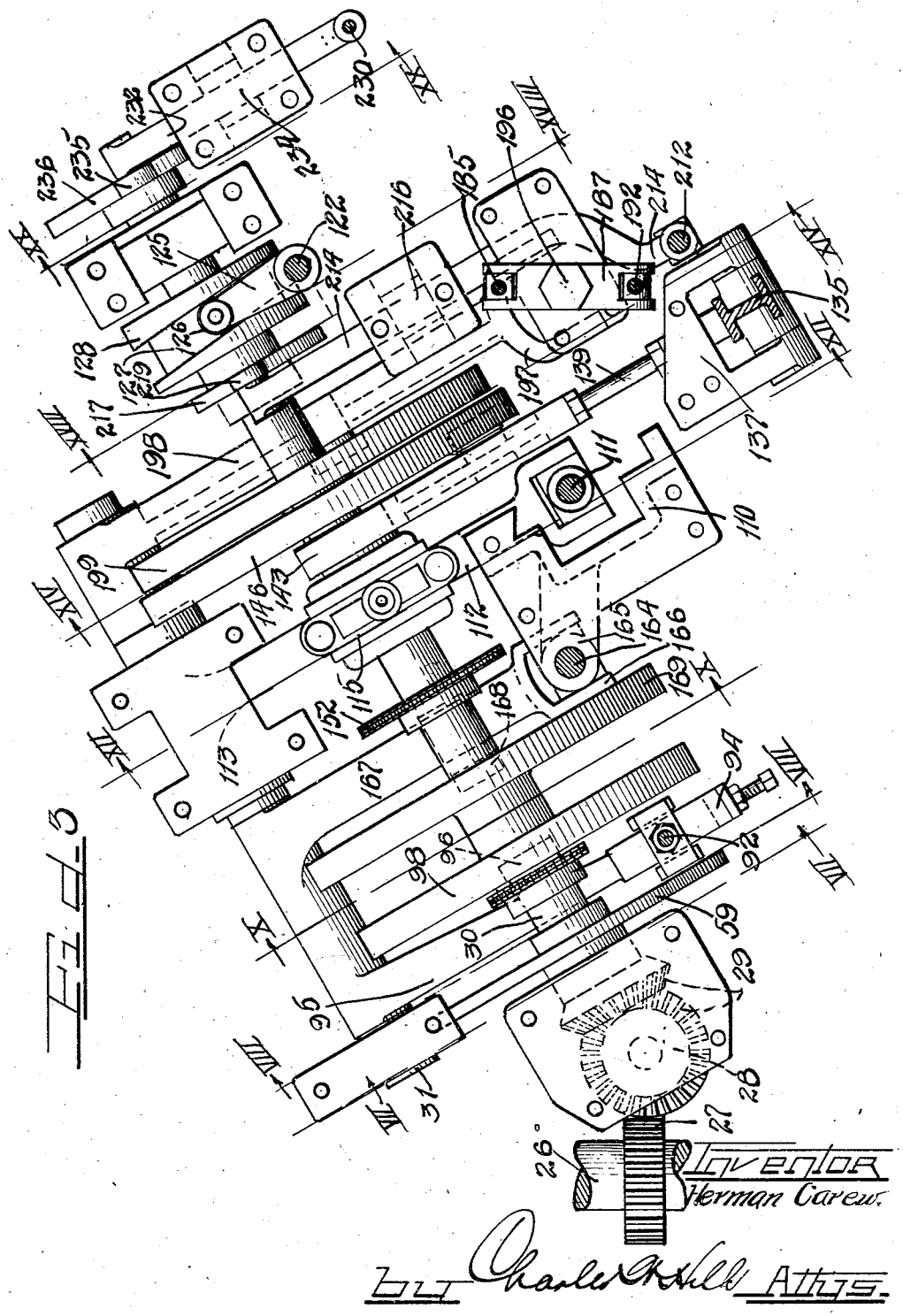

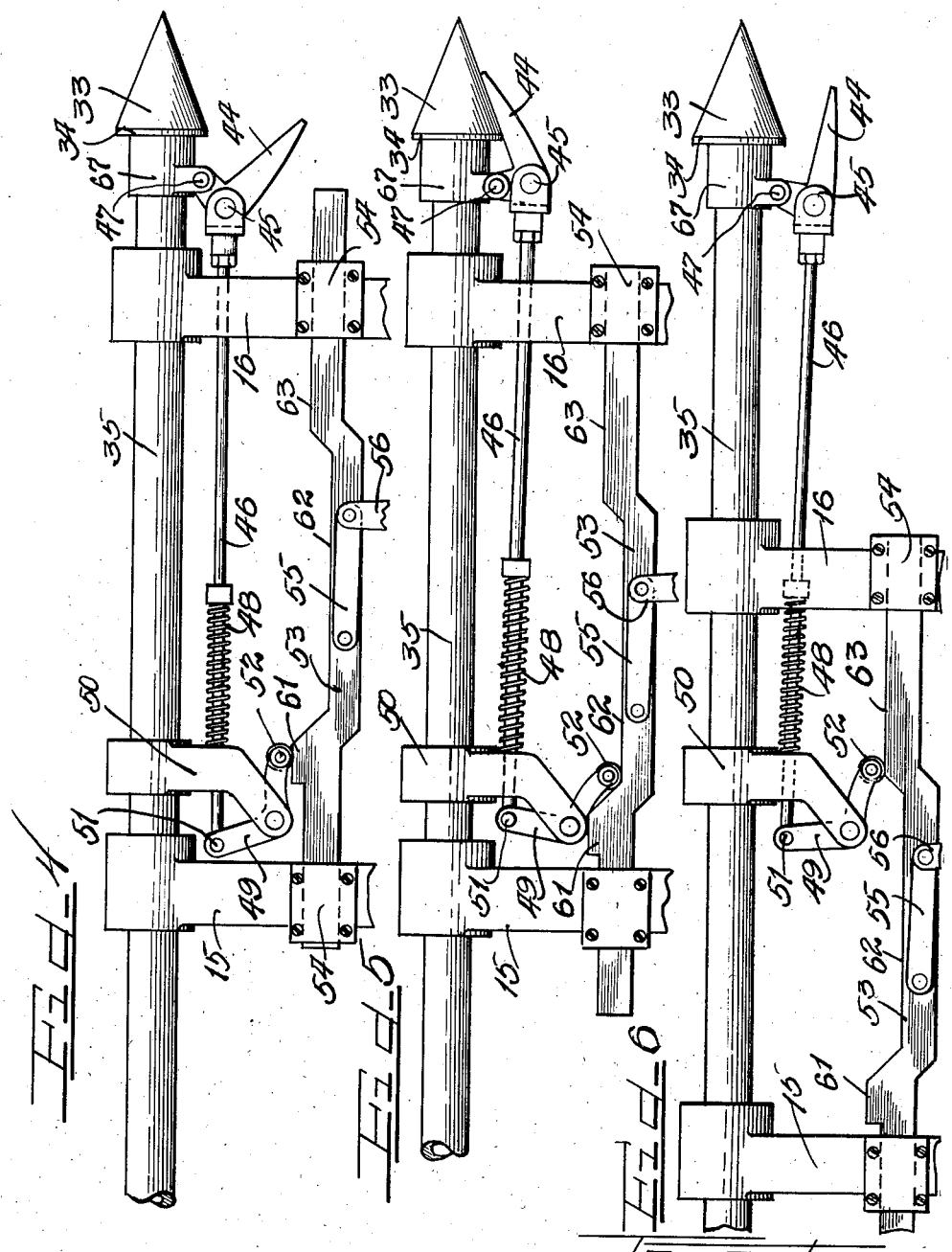

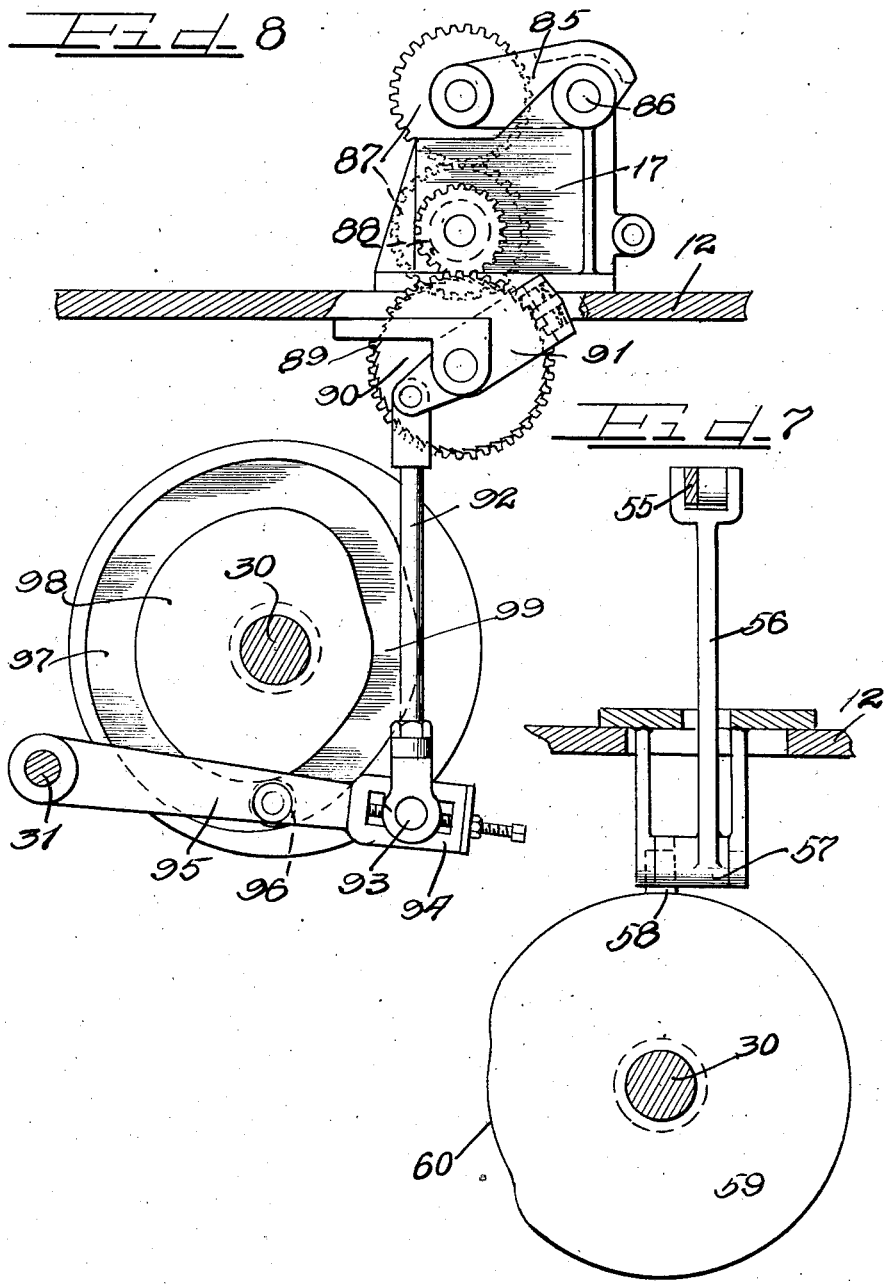

June 27, 1944. H. CAREW 2,352,369
CONTAINER MAKING MACHINE
Filed Aug. 12, 1938 15 Sheets-Sheet 6
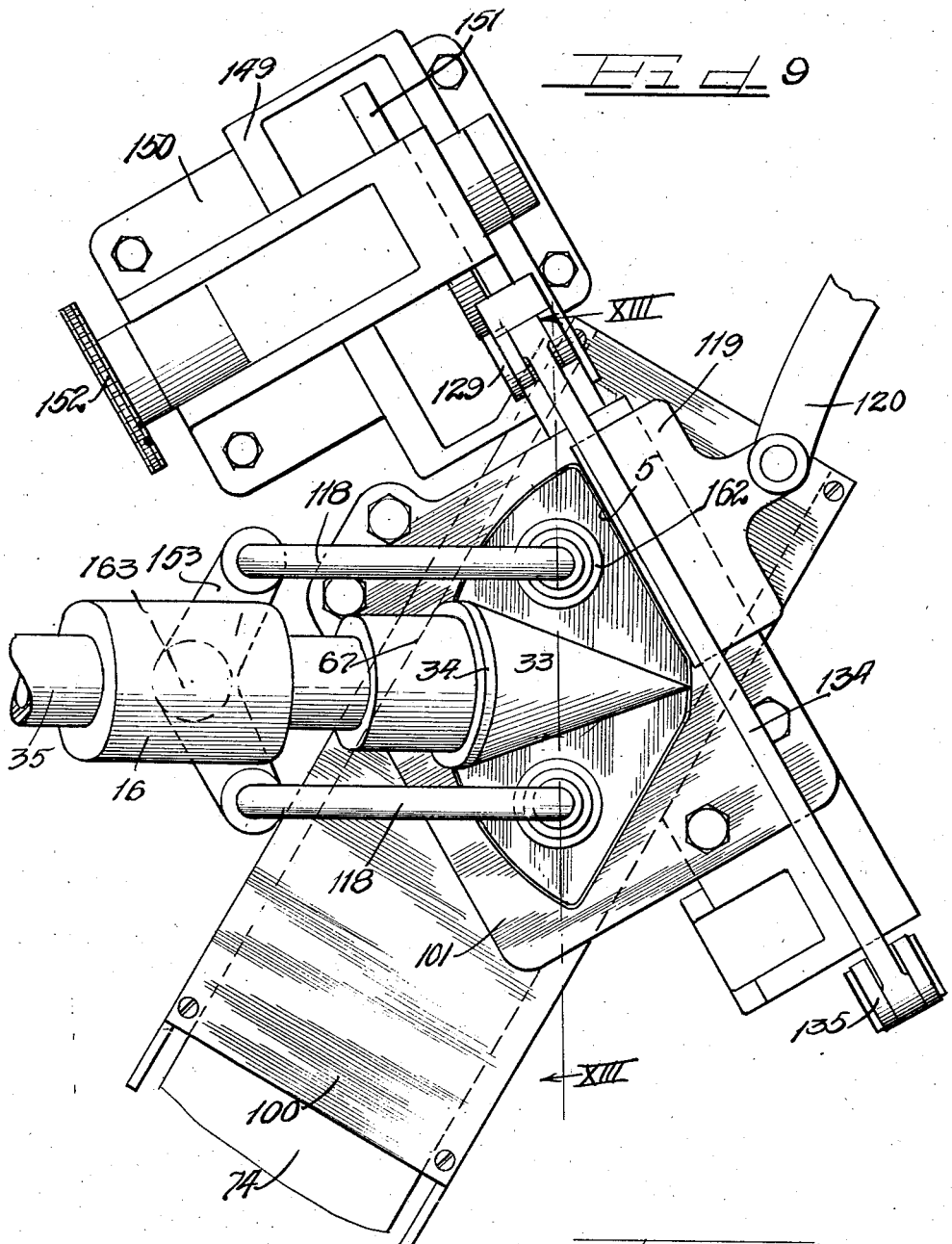

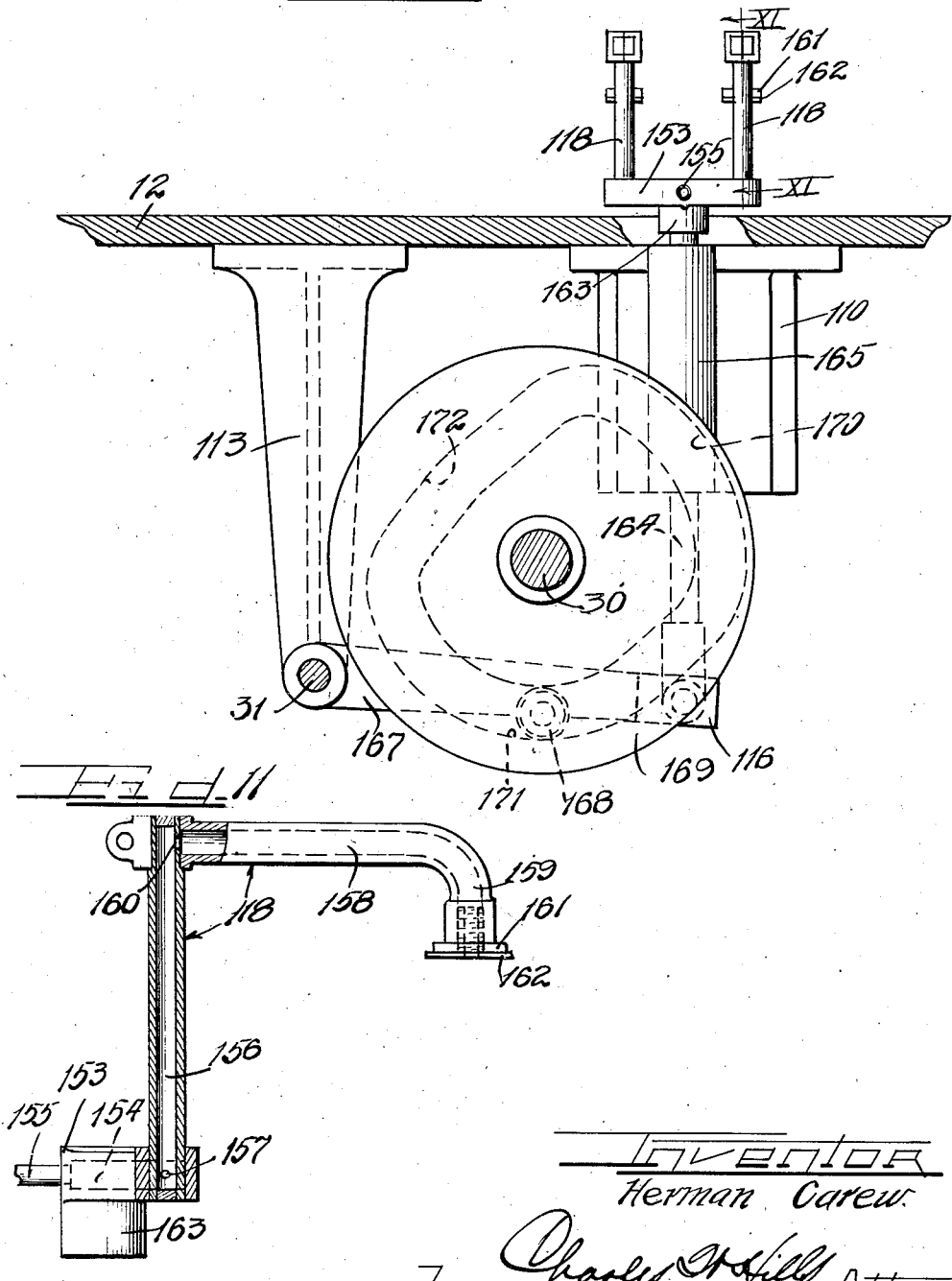

June 27, 1944.    H. CAREW    2,352,369
CONTAINER MAKING MACHIN.
Filed Aug. 12, 1938    15 Sheets-Sheet 8

Inventor
Herman Carew.
By Charles H Hill Attys.

June 27, 1944. H. CAREW 2,352,369
CONTAINER MAKING MACHINE
Filed Aug. 12, 1938 15 Sheets-Sheet 9
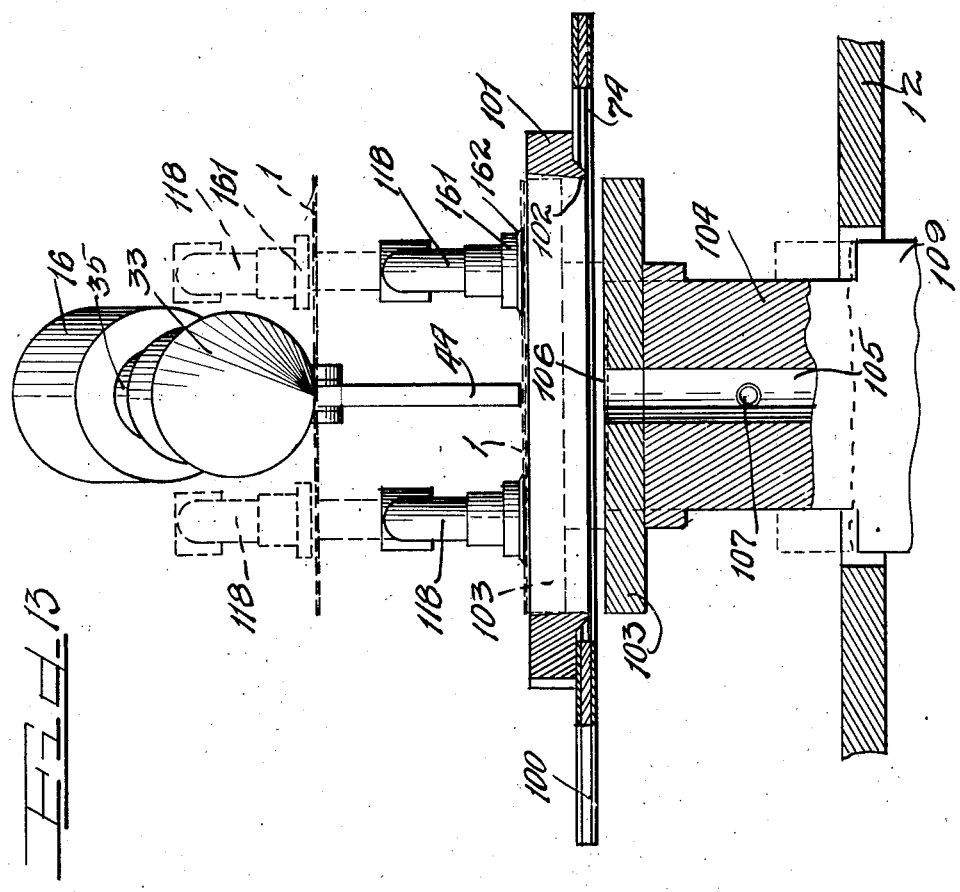
Inventor
Herman Carew.
by Charles H. Hills Attys.

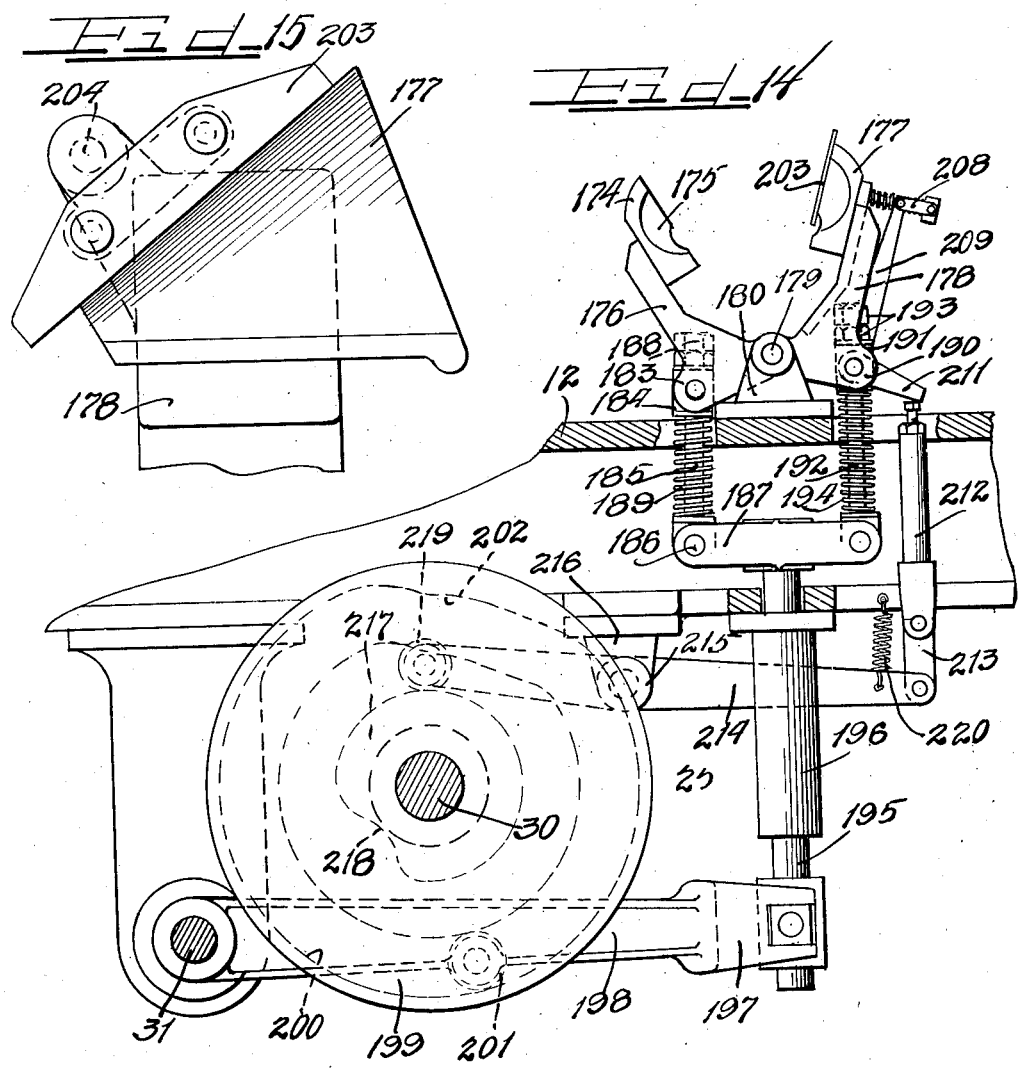

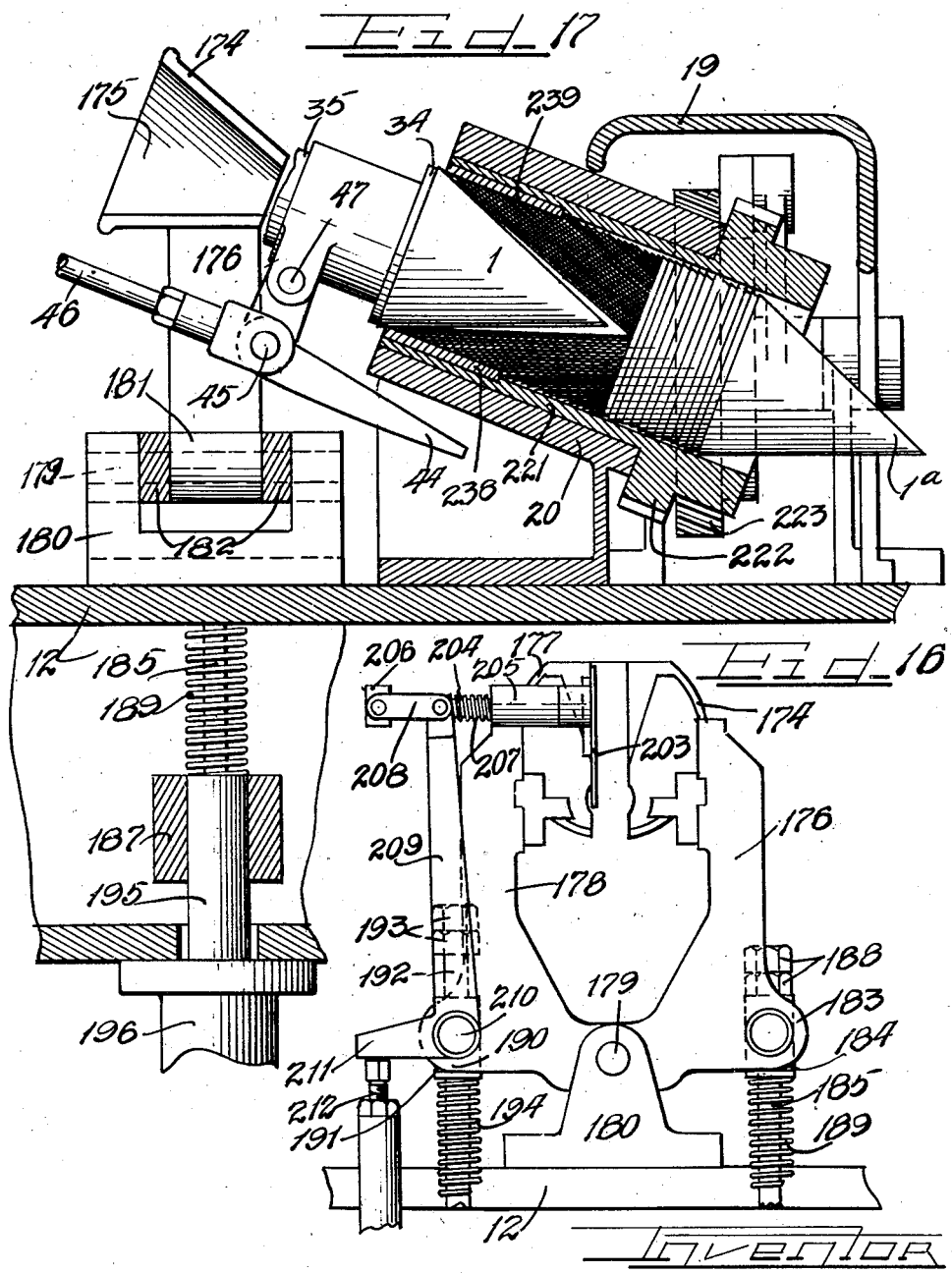

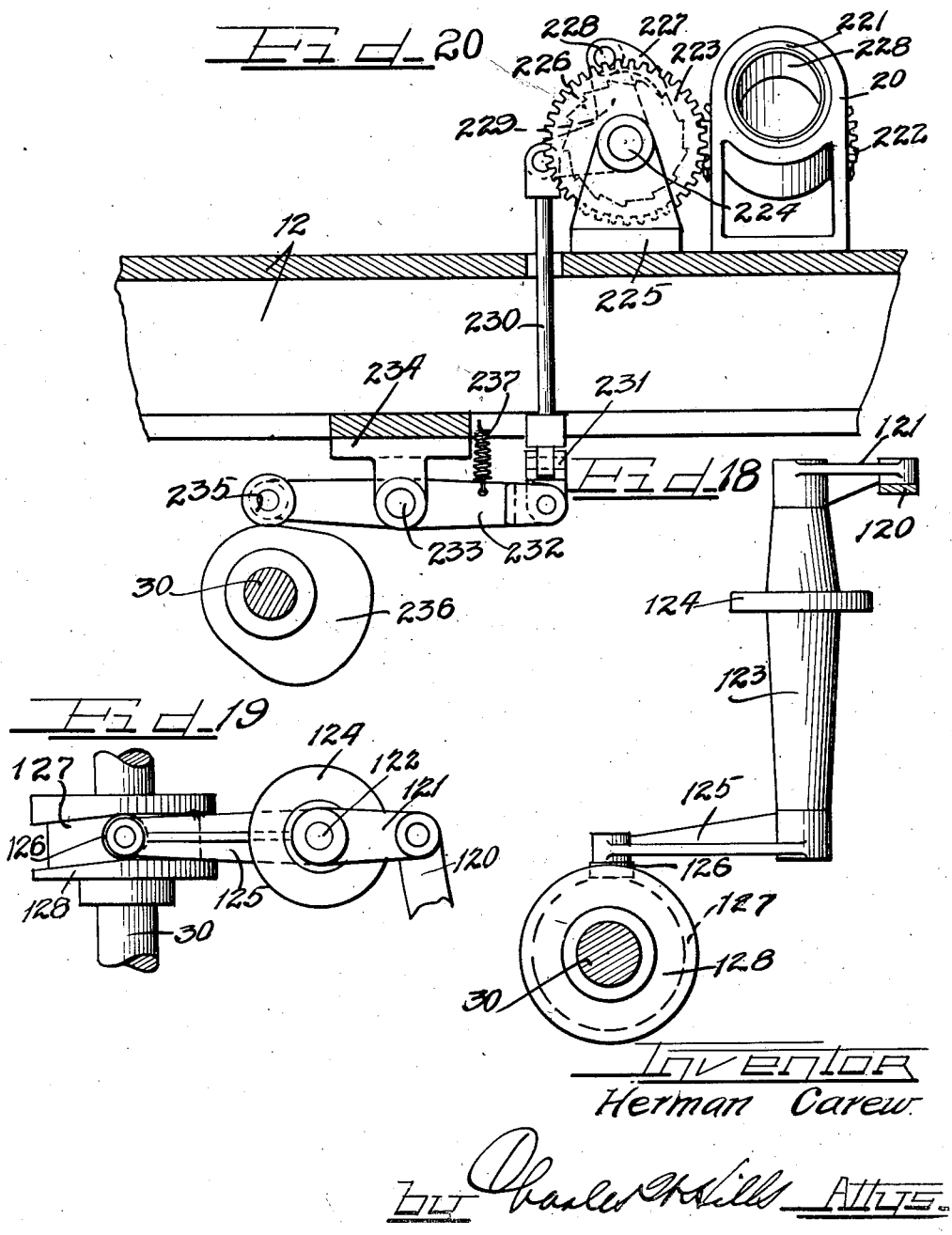

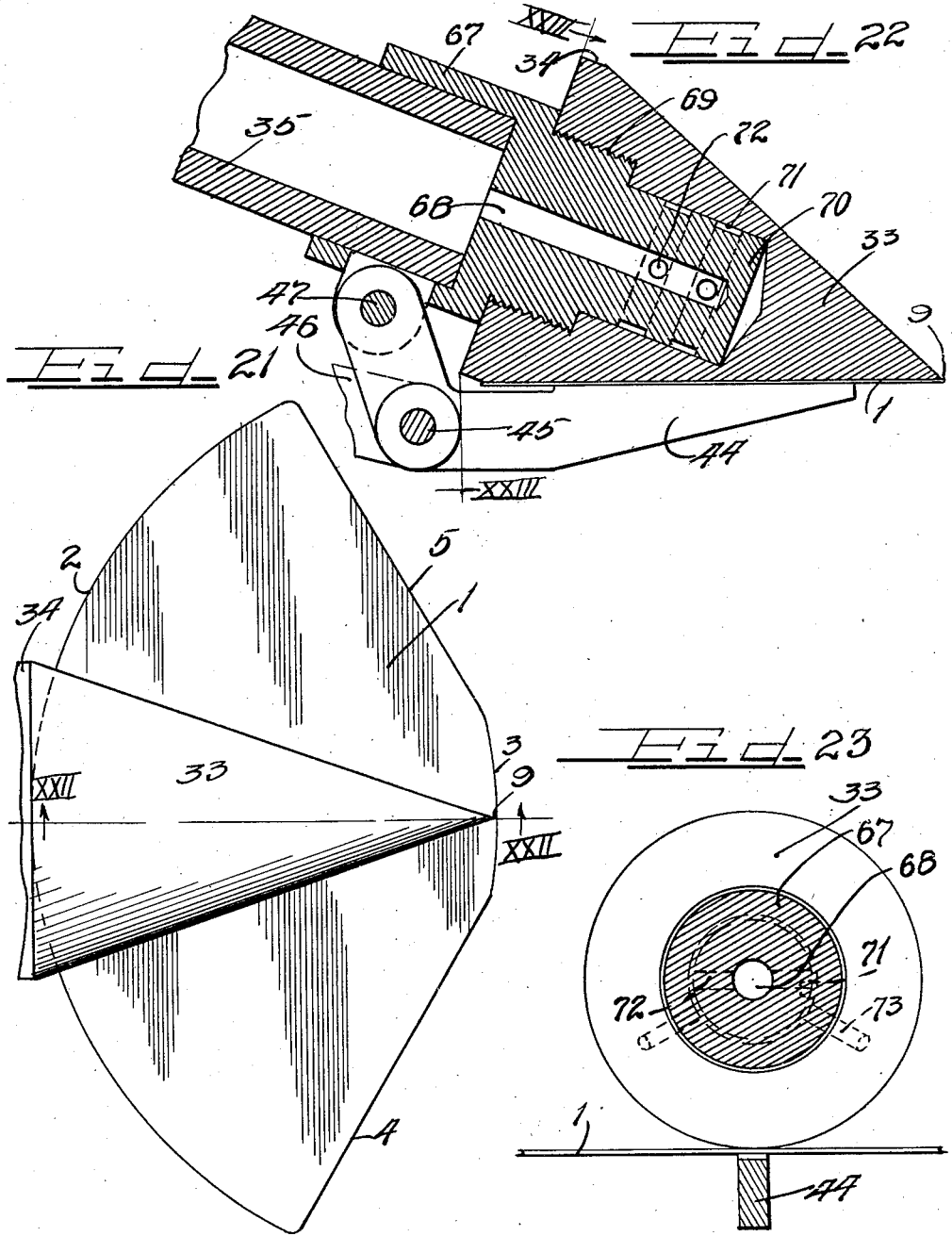

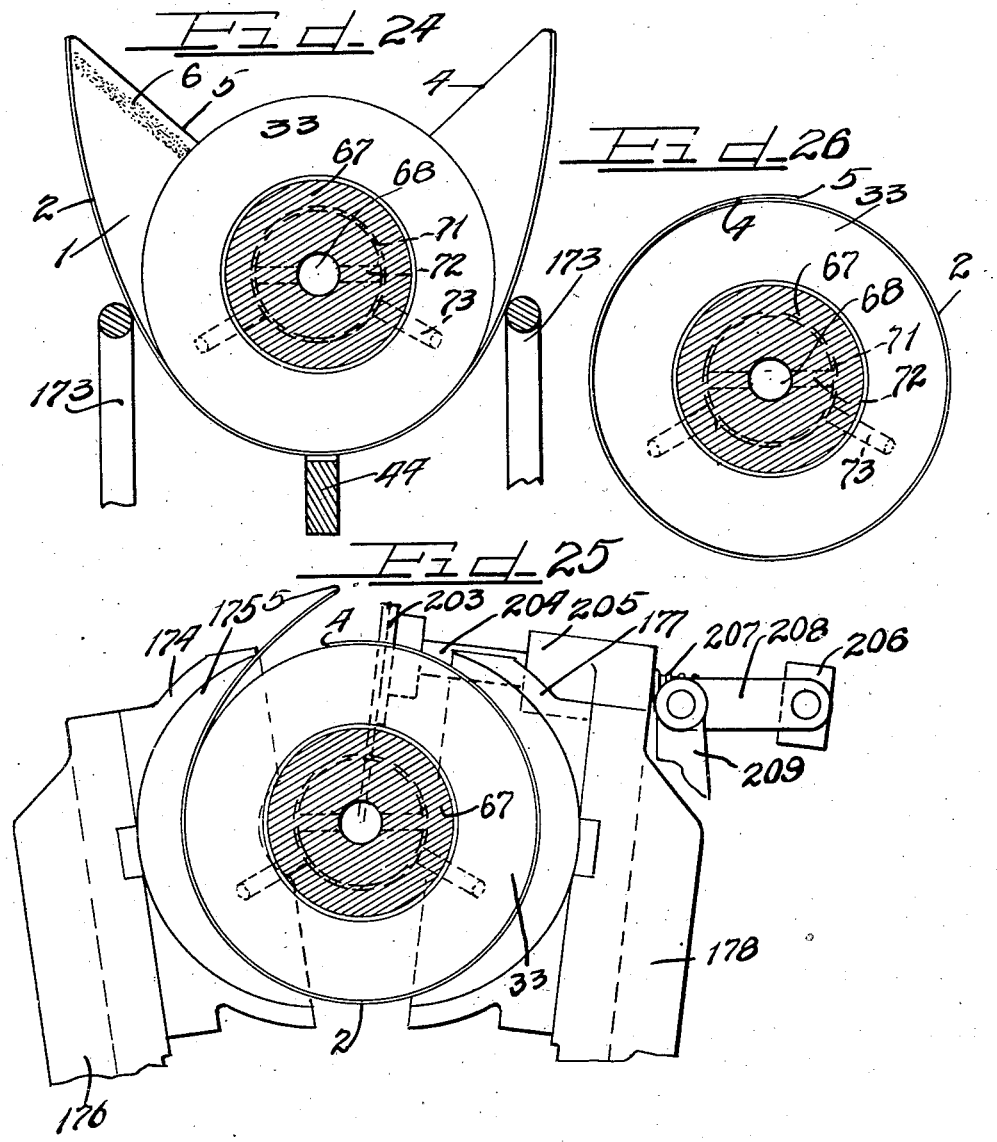

June 27, 1944.  H. CAREW  2,352,369
CONTAINER MAKING MACHINE
Filed Aug. 12, 1938  15 Sheets-Sheet 15
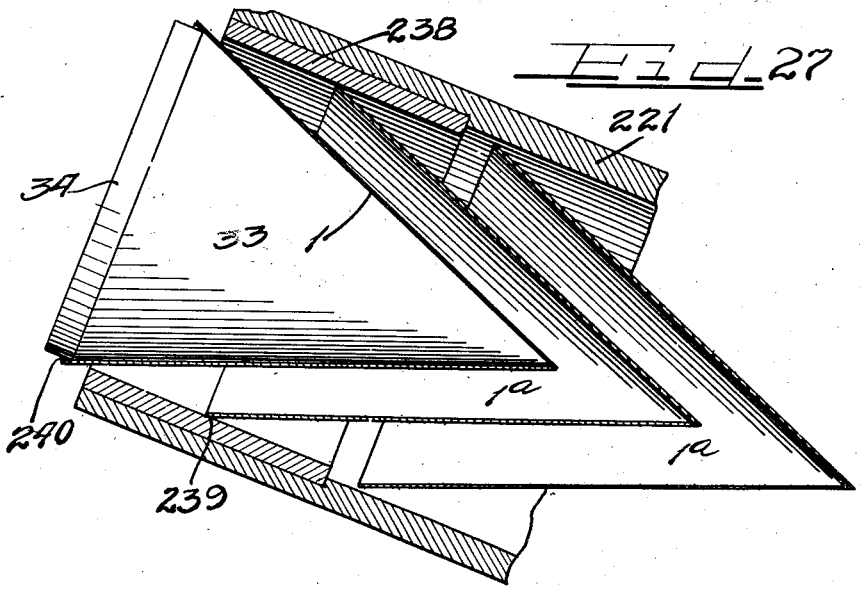
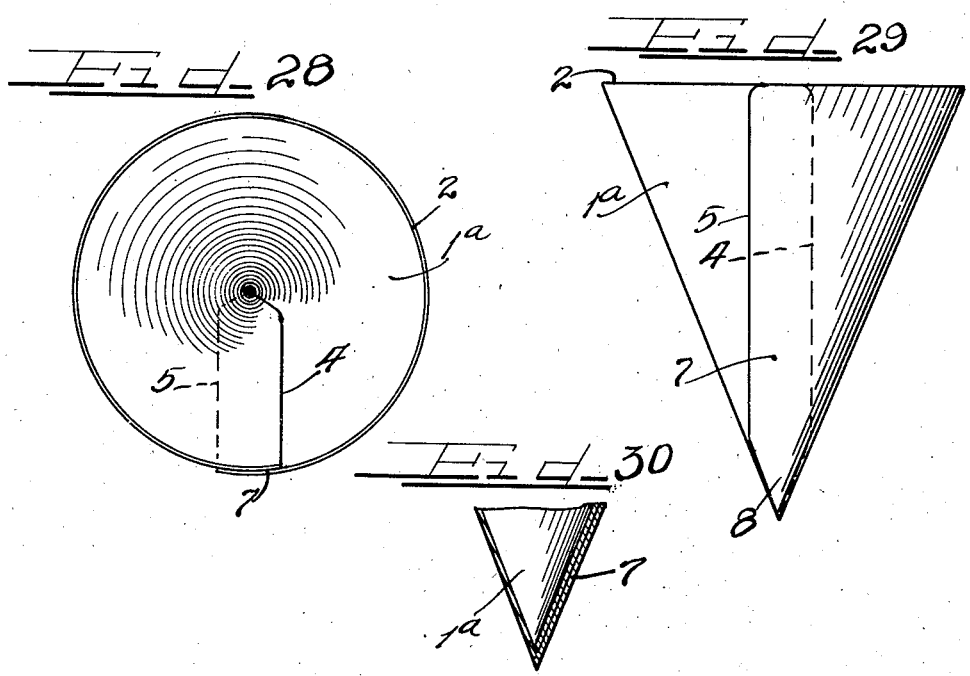
Inventor
Herman Carew.
by Charles H. Hill Attys Patented June 27, 1944

2,352,369

UNITED STATES PATENT OFFICE 2,352,369

CONTAINER MAKING MACHINE

Herman Carew, Easton, Pa., assignor to Dixie Cup Company, a corporation of Delaware Application August 12, 1938, Serial No. 224,479

43 Claims. (Cl. 93—36.1)

This invention relates to improvements in container making machines, the invention being highly desirable for use in connection with the manufacture of containers of the character of drinking cups, ice cream cups or wrappers, and similar devices made of paper or equivalent material sufficiently economical to warrant disposition of the container after a single usage, although the invention may have other uses and purposes as will be apparent to one skilled in the art.

In the manufacture of containers, such, for example, as paper drinking and ice cream cups, economy of production is substantially an essential. One of the most important factors in economy of production is the economy of the stock used in making the containers. In other words, it is desirable to form a container so as to use and waste a minimum amount of stock, consistent, of course, with rendering the container amply sufficient for the intended purpose.

In order to maintain the blank as small as possible, it is desirable to have the overlap between relative portions of the blank in the finished container as nearly uniform as possible, and in order to eliminate wastage to a material extent, it is desirable to so form the blank that it will have a relatively regular contour, with the elimination of projecting portions. In view of the fact that it has been found that speed of production and material handling, and labor saving results from the feeding of the stock in a substantially continuous ribbon into the machine and the striking of blanks from the stock ribbon, it is further desirable to have the blank of such shape that it may be readily struck from a leading portion of a stock ribbon with very little wastage.

With the foregoing in mind, it is an important object of the present invention to provide a machine for forming a container of a given size from less material than any container of the same size of which I am aware has been formed heretofore.

Another object of the invention is the provision of a machine for forming a container of substantially true conical shape, with overlapped marginal portions, the width of overlap being substantially the same throughout the length of the container.

A further object of the invention is the provision of a machine capable of making containers of paper or similar material, with extreme economy of material and operation.

In the past, all of the machines of which I am aware for forming paper containers and similar products of substantially true conical shape have utilized a rotating forming member upon which a blank of material was wound by the rotation of the forming member after a portion of the blank had been engaged in some manner with the forming member. Usually, these formerly known machines embodied a presser element of similar shape as the forming member and rotatable therewith, the rotating presser element acting upon the outside of the blank as it is wound around the forming member to hold it tightly against the forming member and aid in sealing the overlapped portions of the blank. The blank was completely formed on the forming member, and when removed therefrom was in a finished state ready for use. Such a machine utilized a blank having a projecting portion wound around the apexial region of the resultant container or a blank of such size as to provide a very substantial marginal overlap in the resultant container.

With this in mind, it is an important object of this invention to provide a machine capable of forming a cup of paper or the equivalent which is of substantially true conical shape, and which is formed about a non-rotatable forming element or mandrel.

Another object of the invention resides in the provision of a machine for forming containers of substantially true conical shape, utilizing both a mandrel and presser mechanism, neither of which is rotatable.

Also an object of the invention is the provision of a machine for forming conical containers of paper or the like, wherein reliance is had upon previously formed containers as a means for aiding in completing the formation of each succeeding container.

Another feature of the invention resides in the provision of a machine of the character described, wherein previously formed containers are held compressed in stacked relationship, and each succeeding container is forced into the preceding containers in a manner to effectively seal the apex of the last formed container.

The invention also embodies a container forming machine capable of successively severing blanks from the forward end of a stock ribbon and forming each severed blank about a non-rotating mandrel into a container of substantially true conical shape.

The invention further embodies a container making machine utilizing a reciprocating mandrel around which a container is formed and stacked in nested relationship with previously formed containers by the reciprocatory movement of the mandrel.

A further feature of the invention resides in the provision of a container making machine utilizing a reciprocable forming element and presser means of such character and so disposed that the forming element carrying the container being formed may pass by the presser means during the reciprocatory movement without stopping.

A still further object of the invention is the provision of a container making machine utilizing a reciprocatory forming member, against which a blank may be engaged and around which the blank is formed into a container and stacked in nested relationship with previously formed containers during a single forward movement of the forming member.

My novel machine further embodies means for forming a container of substantially conical shape from a single blank of material, forcefully stacking the container to insure adhesion between overlapping parts thereof, and gradually releasing the stacked containers from their forceful nesting.

While some of the more salient features, characteristics and advantages of the present invention have been above pointed out, others will become apparent from the following disclosures taken in conjunction with the accompanying drawings, in which:

Figure 1 is a fragmentary top plan view of a machine embodying principles of this invention;

Figure 2 is a side elevational view of the structure seen in Figure 1;

Figure 3 is an enlarged fragmentary plan sectional view taken substantially as indicated by the line III—III of Figure 2, looking in the direction of the arrows, and illustrating the placement of the drive and control mechanisms;

Figure 4 is a fragmentary elevational view of the reciprocating mandrel, blank gripper, and controlling mechanism therefor, showing the same in an initial stage of operation;

Figure 5 is a view similar to Figure 4, illustrating the mechanism in a second stage of operation;

Figure 6 is a view similar to Figures 4 and 5, showing the mechanism in a final stage of operation;

Figure 7 is a fragmentary vertical sectional view taken substantially as indicated by the line VII—VII of Figure 3;

Figure 8 is a fragmentary vertical sectional view taken substantially as indicated by the staggered section line VIII—VIII of Figure 3, and illustrating the drive for the stock feeding mechanism;

Figure 9 is an enlarged fragmentary view of the structure seen in the right central part of Figure 1;

Figure 10 is a fragmentary vertical sectional view taken substantially as indicated by the line X—X of Figure 3, illustrating the control mechanism for the blank holding means;

Figure 11 is an enlarged fragmentary part sectional, part elevational view of a portion of the blank holding means, taken substantially as indicated by the line XI—XI of Figure 10;

Figure 13 is a fragmentary vertical sectional view, with parts in elevation, taken substantially as indicated by the line XIII—XIII of Figure 9, illustrating the operation of the blank holding means in dotted lines;

Figure 14 is a fragmentary vertical sectional view, illustrating the operation of the blank shaping or presser means, taken substantially as indicated by the line XIV—XIV of Figure 3;

Figure 15 is a fragmentary elevational view of a portion of the structure seen in Figure 14;

Figure 16 is a fragmentary elevational view of a part of the shaping or presser mechanism, taken substantially as indicated by the line XVI—XVI of Figure 1;

Figure 17 is a fragmentary vertical sectional view, with parts in elevation, illustrating the operative association of the forming member with the receiving mechanism, and taken substantially as indicated by the line XVII—XVII of Figure 1;

Figure 18 is a fragmentary vertical sectional view, taken substantially as indicated by the staggered section line XVIII—XVIII of Figure 3, indicating the operating means for a part of the gluing mechanism;

Figure 19 is a fragmentary plan view of the structure seen in Figure 18;

Figure 20 is a fragmentary vertical sectional view, taken substantially as indicated by the line XX—XX of Figure 3, illustrating the mechanism for rotating the cup receiving means;

Figure 21 is an enlarged fragmentary top plan view, somewhat diagrammatic in character, illustrating the disposition of the blank and forming mandrel at the start of the forming operation;

Figure 22 is a fragmentary vertical sectional view of the structure shown in Figure 21, taken substantially as indicated by the line XXII—XXII of Figure 21, with the blank illustrated in elevation;

Figure 23 is a fragmentary vertical sectional view through the structure of Figure 22, taken substantially as indicated by the staggered section line XXIII—XXIII of Figure 22.

Figure 24 is a fragmentary sectional view similar in location to Figure 23, but illustrating a further step in the forming of the blank;

Figure 25 is a fragmentary vertical sectional view illustrating the operation of the shaping or presser mechanism;

Figure 26 is a vertical sectional view of the forming member carrying the blank just before the finish of the forming operation and prior to the positioning of the blank in the receiving means;

Figure 27 is a fragmentary vertical sectional, diagrammatic and exploded view, illustrating the reception of the forming member and blank by the receiving means to complete the sealing of the blank;

Figure 28 is a top plan view of a finished container;

Figure 29 is a side elevational view of a finished container; and

Figure 30 is a fragmentary vertical sectional view through the apexial region of the finished container.

As shown on the drawings:

Figure 12:
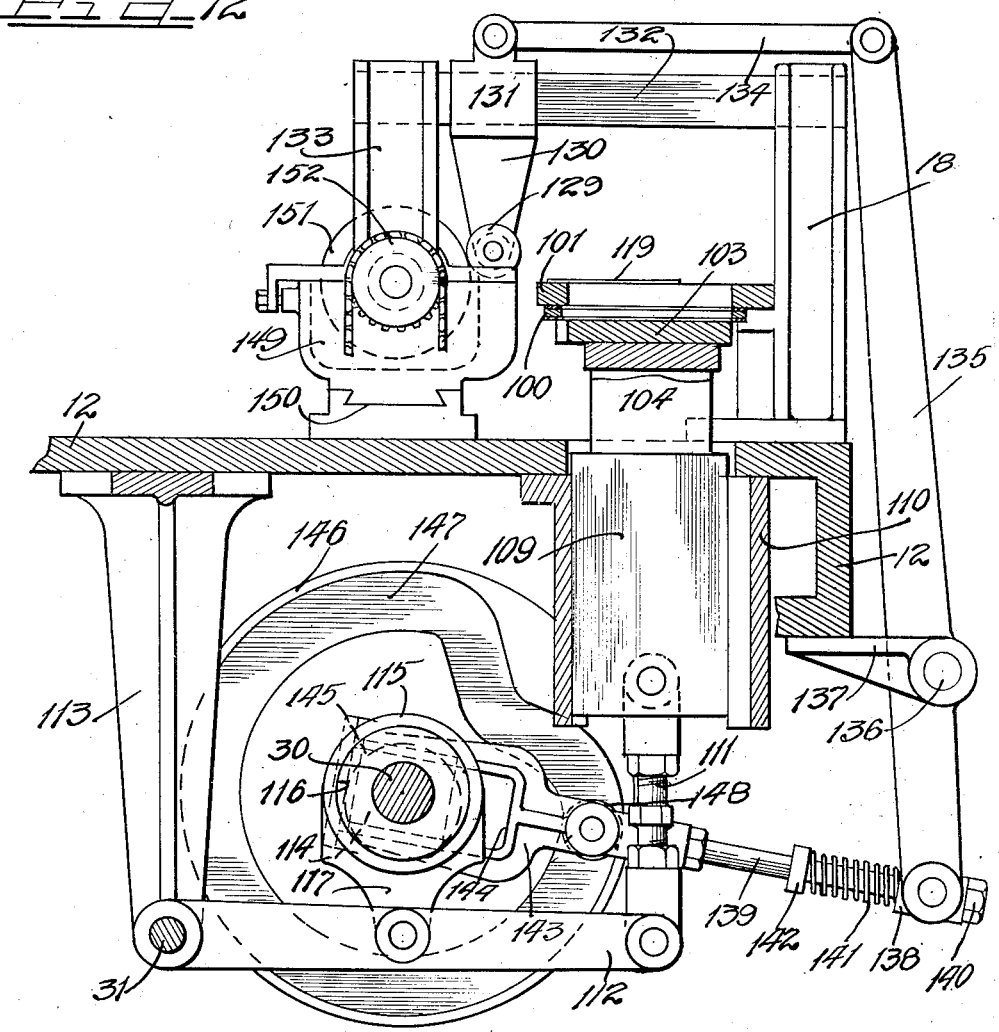
Figure 12 is a fragmentary vertical sectional view, with parts in elevation, taken substantially as indicated by the section line XII—XII of Figure 3, illustrating the control means for the cutter mechanism and the gluing mechanism.

By way of presentation, the machine selected for purposes of illustration is capable of making a container of the nature of a paper drinking cup of substantially true conical shape. It will, of course, be appreciated that the resultant containers made upon the machine are not limited as to size, but it will be apparent from the disclosures hereinafter that by varying the size of various parts of the machine, either making these parts larger or smaller, as the case may be, containers of different sizes may be manufactured without change in the function of the parts or operating principles of the machine.

It will be appreciated that the machine embodied in the present invention manufactures a new and novel container embodying a new and novel blank, which is more fully set forth, described and claimed in my co-pending application for U. S. Letters Patent entitled "Container and blank therefor," filed September 9, 1937, Serial No. 162,968.

It will be further appreciated that a new and novel method is embodied in the manufacture of the container, and this new and novel method is more fully set forth and described, and also claimed in another co-pending application.

The method in general

While, as stated above, the method of making a container like that manufactured by the present invention is described and claimed in a co-pending application, nevertheless, for the purpose of clarity, it may be best herein to briefly mention certain steps of the method.

The stock is fed into the machine in a substantially continuous ribbon from a suitable source of supply, such as a roll of stock of the proper width. Blanks are successively severed from the leading end of the stock ribbon, and coincidentally with its severance, a blank is elevated into contact with a non-rotatable but reciprocable mandrel. A suitable gripper holds the blank against the mandrel along substantially a line contact while suitable suction means hold the projecting portion of the blank in position. Supporting means are moved under a marginal portion of the blank and a stripe of glue is provided on that portion.

The mandrel carrying the blank then moves forward, and a pair of arms elevates projecting portions of the blank, curving them about the mandrel. Continuing its forward movement, the mandrel passes by suitable presser means which wrap the blank tightly around the mandrel, sealing the overlapped margins of the blank, and the blank may be held upon the mandrel during this operation partly by suction through the mandrel. After the blank is thus tightly wrapped around the mandrel, it is forcibly nested in previously formed cups by the still forward movement of the mandrel, these previously formed cups being held against full expansion within a cylinder of slightly less diameter than the mouth end of a completed cup. This forceful nesting insures the adequate adhesion of the overlapped margins of the blank and also the sealing of the apexial portion of the cup, so that the cup will not leak when containing a liquid. The cup is maintained firmly in such nested position for a reasonable length of time sufficient to insure the setting of the adhesive, and then as each succeeding cup is forced into nested relationship, previously formed cups are gradually moved out of the compression part of the receiver and permitted, due to their own resiliency, to expand to their full size and thus become loosely nested, so that there will subsequently be no trouble in properly dispensing the containers one at a time.

After each cup is forcefully nested, the mandrel moves back into proper position for engagement with the next severed blank.

The blank and cup

In Figure 21, there is illustrated a blank 1 which is substantially quadrangular in shape, having a pair of opposed arcuate edges 2 and 3 and a pair of opposed substantially straight side edges 4 and 5. It will be seen that the side edges 4 and 5, which are preferably not radial to either arcuate edge, converge towards the apex of the finished vessel but do not meet, these edges terminating at the ends of the smaller arcuate edge 3.

The longer arcuate edge 2 defines the mouth of the resultant cup, while the arcuate edge 3 will be shaped in a manner to provide an overlap in the apexial region of the finished cup. Both arcuate edges are preferably of the same radius, and in the illustrated instance the center of the arc 2 is preferably at the mid-point of the arcuate edge 3, and vice versa, so that the entire blank is symmetrical in that if it is folded on the median line from the edge 2 to the edge 3, both halves of the blank will coincide.

During the forming of the blank, the smaller arcuate edge 3 is the leading edge, and prior to the shaping of the blank around the mandrel, a stripe or the equivalent of a suitable adhesive 6 is placed along the margin of the blank adjoining the edge 5, as seen in Figure 24. The adhesived margin is lapped over the margin adjacent the edge 4 to provide an overlap 7, as seen in Figures 28, 29 and 30. It will be noted that the overlap is preferably of equal width throughout substantially the length of the finished cup, except where the overlapped portions taper toward the apex, as indicated at 8 in Figure 29.

With reference to Figures 21 and 22, it will be noted that the blank is formed around a point 9 as the apex of the finished cup, which point, while adjacent the leading edge 3, is spaced inwardly from this edge, so as to insure a closed apex in the finished cup.

The machine in general

With reference more particularly to Figures 1 and 2, it will be seen that the machine in general includes a plurality of suitable supports 10 closed in by side plates 11, and carrying a hollow bed 12 which, together with the side plates, contains much of the control mechanism seen more particularly in Figure 3. Of course, the hollow bed 12 is provided with suitable openings wherever needed to accommodate the various operating parts connecting the control mechanism with the elements to be operated thereby. Projecting from one end of the understructure are suitable bracket means 13 for carrying a roll of paper stock 14 of proper width for the successive severance of the aforesaid blanks 1.

Mounted upon the hollow bed 12 is a pair of suitable bracket members 15 and 16, respectively, each carrying a bored head through which the shank of the reciprocable mandrel is slidable. Also on the hollow bed plate 12 is a superstructure including both a pair of frame members 17—17 for carrying the feeding rolls, and a frame member 18 carrying a part of the gluing mechanism. At the finish end of the machine, or that end where the finished containers are received, is a suitable housing 19 associated with an inclined holder 20 for the cup receiving means.

It will be appreciated that the various frame structures and supporting members above mentioned will be fabricated and shaped to adequately support the various parts of the machine, and suitable journal and bearing means will be associated with the frame members to accommodate the various shafts, all in a manner to meet the exigencies of the particular construction. Accordingly, it is not necessary herein to specifically describe every angle and formation of the frame and supporting structures and mention each bearing, journal and the like for the various shafts, since such structures are illustrated and their respective functions known without specific explanation.

*The major shafting and drive mechanism*

The machine may be driven from any suitable source of power, such, for example, as an electric motor 21 (Figure 1) mounted on a frame or support 22 adjacent the machine. By means of a suitable coupling 23, the shaft of the motor is connected to operate one of the shafts of a suitable transmission contained in a housing 24. Another transmission shaft is connected through another coupling 25 to drive a shaft 26, which is the main driving shaft for the machine.

The shaft 26, through a suitable set of gears 27, in turn drives a vertical shaft 28 (Figures 2 and 3) which, in turn, through a pair of similar bevel gears 29, drives a horizontal and angularly disposed shaft 30. This latter shaft 30 carries the major portion of the drive wheels and actuating cams for the various mechanisms of the machine. An undriven shaft 31, spaced from but paralleling the shaft 30, functions as a pivot shaft for many of the levers, crankarms and the like actuated by mechanism associated with the shaft 30.

Near the opposite side of the frame structure from the motor 21, the shaft 26 (Figure 1) carries means for reciprocating the mandrel shank, an undriven shaft 32 paralleling the shaft 26 functioning as a pivot shaft for the connecting members.

Preferably, the present invention embodies several complete cup-making units, of which only one is illustrated in the accompanying drawings. It is to be understood, therefore, that the shaft 26 does not terminate adjacent the far side of the hollow bed plate 12 from the motor, but continues on to drive one or more units of the same character as that illustrated. Adjacent units may preferably be in the nature of confronting units in that the stock rolls 14, for example, may be on opposite sides of their respective units, as a matter of convenience and to facilitate installation, as well as equalize load on some parts of the entire structure.

*Forming element and associated mechanism*

With reference more particularly to Figures 1, 2, 4, 5 and 6, it will be seen that the forming element includes a conical mandrel 33 having a cylindrical rear portion 34, carried on a hollow elongated shank 35 which, as before stated, is reciprocable in the bearings of the supporting brackets 15 and 16. Obviously, the mandrel 33 and its shank 35 are prevented from rotating about their own axis, but merely move in a reciprocatory manner along an obliquely downward path, as best seen in Figure 2. As stated before, the mandrel deposits formed blanks successively in the receiving means carried by the housing 20, and due to the inclination, finished containers may drop from the receiving means by gravity.

The shank 35 is reciprocated by means of a relatively large bell crank 36 pivoted to the aforesaid undriven shaft 32, as indicated at 37. The upper free end of the bell crank is connected through a link 38 to an intermediate portion of a cross bar 39, which in turn is secured at one end to the mandrel shank 35. With reference to Figure 1, it will be seen that this cross bar is preferably continuous and extends onward beyond the showing in this figure so that it may be connected at its other end to a similar mandrel shank, the connection with the link 38 being preferably midway between the two mandrel shanks so as to balance the load.

The other free end portion of the bell crank 36 is provided with a double cam follower 40 riding in similar confronting grooves 41 of a pair of twin cams 42—42 (Figures 1 and 2). These cams are mounted on the main driving shaft 26 to rotate therewith, and the respective cam grooves 41 are so designed that the mandrel shank 35 undergoes a complete forward movement and return during a revolution of the shaft 26, so that for each revolution of this shaft a finished container is deposited within the receiving means. As the structure is seen in Figure 2, the mandrel shank 35 has just reached its rearwardmost position, where, in accordance with the contour of the cam grooves 41, it will remain for substantially a half revolution of the shaft 26, during which time the paper stock will be fed, a blank severed therefrom, and applied to the mandrel 33. When the opposite portion 43 of the groove reaches the follower 40, the shank will be urged forwardly, and it will be seen that there is a sudden change in the groove contour substantially midway of the operating portion thereof to cause the shank to drive the mandrel forcibly into the receiving mechanism.

Associated with the mandrel 33 is a gripper in the form of a bell crank jaw 44 pivoted, as at 45, to a reciprocable rod 46, and also pivoted, as at 47, to a collar fixed on the shank 35. As best seen in Figures 4, 5 and 6, a spring 48 is positioned to normally urge the gripper into closed position, or that shown in Figure 5 with the jaw tightly holding a blank of stock between itself and the mandrel. The action of this spring is limited by a bell crank 49 centrally pivoted to a collar bracket 50 fixed to the mandrel shank 35. One free end of this bell crank is pivotally connected, as at 51, to the rear end of the rod 46, and the other free end carries a cam rider in the form of a roller 52.

This cam rider follows along the upper edge of a cam bar 53 disposed beneath the mandrel shank and reciprocable in suitable slots in the aforesaid supporting brackets 15 and 16, the bar being held in place by removable plates 54—54. The mechanism for reciprocating the cam bar includes a link 55 pivoted at one end to an intermediate part of the bar, and at the other end to a bell crank 56 pivoted, as indicated at 57, to a suitable stub shaft (Figures 2 and 7). The other arm of this bell crank carries a cam follower in the nature of a roll 58 riding the surface of a cam 59 mounted on the aforesaid camshaft 30 (Figures 2, 3 and 7). The major portion of the surface of the cam 59 is circular, and this portion keeps the cam bar 53 in the position seen in Figures 5 and 6 for the major part of a revolution, while the varied surface indicated at 60 causes the cam bar to be moved to the position seen in Figure 4, but for a briefer time.

The function of this cam bar 53 is best illustrated in Figures 4, 5 and 6. As seen in Figures 2 and 4, the mechanism is set at the very beginning of the operation with the gripper 44 being held in wide open position, due to the follower 52 riding a high hump 61 on the cam bar and thus holding the rod 46 in its rearwardmost position against the action of the spring 48. As soon as a blank has been brought into engagement with the mandrel 33, the cam bar is moved to the left in the manner above described, so that the follower 52 reaches a lower level portion 62 of the bar, thus permitting the spring 48 to move the rod 46 to its forwardmost position and close the clamping jaw 44 to hold the blank on the mandrel, as seen in Figure 5. The mandrel shank, which up to this time remains stationary, now moves forward and the gripper jaw remains closed until the follower 52 reaches another hump 63 on the bar which is of less height than the aforesaid hump 61, causing the jaw 44 to open to the mid-position seen in Figure 6. This mid-position of the jaw is maintained during the further forward movement of the mandrel shank beyond the showing in Figure 6, and likewise maintained during the first portion of the reverse movement. The maintenance of the jaw 44 in the intermediate position seen in Figure 6 is to permit this jaw to clear the presser and receiving mechanisms to be later described in its reciprocatory movement. Of course, during the reverse movement, after the follower 52 rides off the portion 63 of the cam bar, the jaw will again close, holding nothing, and when the mandrel shank reaches substantially the end of its return movement, the cam bar is again moved to the right to the position seen in Figures 2 and 4, thus again opening the jaw 44 for the start of another operation.

It may also be desired to augment the holding action of the gripper jaw 44 and further to provide a means for retaining the blank upon the mandrel after the jaw has been partially opened. To this end, it may be desired to provide suction means through the mandrel. As before stated, the mandrel shank 35 is hollow, and with reference to Figure 1, it will be seen that a suction tube or conduit 64 is connected to one end of the hollow shank and at its other end to a control box 65 which contains suitable apparatus so arranged as to develop and eliminate suction through the mandrel shank at the proper times. Another conduit 66 may lead from the control box to any suitable suction developing mechanism.

Now with reference more especially to Figure 22, it will be seen that the shorter arm of the bell crank jaw 44 is pivoted at 47 to a collar member 67 fixed to the shank 35. This collar member has a central passage 68 therethrough, in alignment with the hollow in the mandrel shank. The forward part of the collar 67 is stepped down twice, and the mandrel proper 33 is threaded onto this collar, as indicated at 69. The forward portion or nose 70 of the collar is provided with a pair of annular grooves 71, and transverse passages 72 establish communication between these grooves and the hollow 68. One or more oblique passages 73 (Figure 23) are provided in the mandrel 33. These passages 73 extend to the surface of the mandrel, so that when they are covered by the blank, suction through the mandrel shank will hold the blank in position upon the mandrel.

Stock feeding means

The feeding means incorporated in the present invention are rather simple. From the aforesaid stock supply roll 14, a substantially continuous ribbon of stock 74 passes over a roll 75, and then over the opposite side of a roll 76 driven from the shaft 26 by a suitable chain and sprocket connection 77. A presser roll 78 (Figure 2) bears against the strip opposite the roll 76. This presser roll is carried on the long arm of a bell crank 79 pivoted to the frame at 80, and provided with a cross handle 81 on the other arm thereof. A suitable spring 82 holds the bell crank and roll 78 in proper position. When it is desired to thread the stock ribbon 74 through the aforesaid rolls, it is a simple expedient to push on the handle 81 and elevate the roll 78 against the action of the spring 82 until the stock ribbon has been passed over the other roll.

After leaving the aforesaid mechanism, the stock ribbon is permitted to invert itself in a loop, as seen in Figure 1, and then passes between a pair of intermittently driven feed rolls 83 and 84 supported by the aforesaid frame members 17—17. The upper roll 84 is carried in a suitable bracket 85 pivoted to the frame member 17, as indicated at 86, so that this roll may temporarily be raised to permit threading of the stock ribbon between the rolls.

The drive means for the feed rolls are best seen in Figures 3 and 8. The lower roll drives the upper roll by means of a pair of like gears 87. The lower roll also carries a smaller gear 88 in mesh with a larger gear 89 fixedly associated with a ratchet wheel 90, which latter gear and wheel project through a suitable aperture in the bed plate 12. The ratchet wheel 90 is intermittently driven in one direction by a pivoted pawl 91, one end of which is connected to a vertical rod 92, in turn pivotally connected at its opposite end, at 93 by means of an adjustment 94, to a crank arm 95. The opposite end of the crank 95 is pivoted on the aforesaid stationary shaft 31. In an intermediate position, the crank carries a cam follower in the nature of a roll 96 engaged in a cam groove 97 of a cam 98 mounted on the cam shaft 30. The major portion of the cam groove 97 is shaped substantially circular to maintain the feed rolls at rest, but a portion thereof, indicated at 99, is shaped to first raise and then lower the crank 95 to cause the feed rolls to move sufficiently to advance the stock ribbon for the cutting of a blank from the end thereof.

Blank cutting mechanism

The mechanism for successively severing blanks from the leading end of the stock strip 74 is best seen in Figures 3, 9, 12 and 13. In the region of the cutting mechanism, the stock strip 74 is fed through a tubular fabricated guide 100 to maintain the ribbon in exact position for the cutting of a blank. A die block 101 is disposed on top of the guide, and the cutting portion 102 thereof projects through a suitable aperture in the guide (Figure 13). Of course, the cutting part 102 is hollow to intimately receive a punch die 103 which is of the shape of the above described blank 1.

The punch die 103 is mounted on a suitable block 104, and both are interiorly bored, as indicated at 105, which bore communicates with a hollow 106 in the top surface of the punch die. A suction is created in the hollow by way of a port 107 to which a suitable suction line 108 (Figure 1) is connected, the suction line running through the aforesaid vacuum control unit 65. Thus, contemporaneously with the cutting of the blank, the blank is firmly held to the punch die by means of this suction, and maintained in exact alignment for forming. Otherwise, as the punch die moves upwardly, as indicated by dotted lines in Figure 13, there would be danger of a current of air or some other medium disturbing the proper positioning of the blank.

The block 104 is mounted on a piston block 109 slidable within a suitable guideway 110 carried by the hollow bed plate 12 of the machine. In order to reciprocate the piston block, an adjustable link 111 is pivotally connected at one end to the piston block and at the other end to a crank 112. At the opposite end thereof, this crank is pivoted on the aforesaid stationary shaft 31 (Figures 3 and 12). As also seen in these same figures, this stationary shaft 31 is preferably carried by a plurality of brackets, of the nature of the bracket 113, bolted or otherwise secured to the bed plate of the machine. The crank 112 is actuated by a wheel 114 carried on the cam shaft 30 in an eccentric position, as seen in Figure 12. Around this wheel is a housing 115 having a cylindrical interior 116 within which the wheel 114 rotates. A bracket 117 from the housing is pivotally connected to the crank. Obviously, therefore, when the eccentrically mounted wheel 114 rotates, the housing together with the crank is caused to move up and down with the rotation of the wheel, and at each upward movement a blank is severed from the stock ribbon 74.

*Gluing mechanism and associated apparatus*

This mechanism is best seen with reference more particularly to Figures 9, 12, 13, 18 and 19.

As a blank is severed from the stock ribbon by the punch die and elevated to the lower of the dotted line positions in Figure 13, the blank is received by initial holding members 118 which will be later described herein. Of course, contemporaneously with the reception of the blank by the holding members, the suction through the punch die is removed to release the blank. The punch die then descends, leaving the severed blank held by suction through the holding members 118, with the blank disposed slightly above the die block 101. While the blank is in this position, the aforesaid stripe of adhesive 6 is applied adjacent the side edge 5 on the top surface of the blank. In order to apply this adhesive, suitable backing must be provided beneath the blank.

To this end, a relatively thin metallic plate 119 is moved under a margin of the blank and held in that position until the glue has been applied. The means for operating the plate include an arcuate link 120 pivoted to the plate at one end and at the other end to a crank arm 121 fixed to a shaft 122 (Figures 1, 18 and 19). This shaft is journaled in an elongated bearing 123 provided with a collar 124 which rests upon the bed plate of the machine, as seen in Figure 1, to maintain this particular actuating mechanism in position. Another crank arm 125 is secured to the opposite end of the shaft 122, and the free end of this crank arm is provided with a cam follower in the nature of a roller 126 which rides in a suitable groove 127 in a cam 128 carried by the cam shaft 30. This groove 127 is shaped to oscillate the shaft 122 through the crank arm 125 and thus move the plate 119 into and out of position beneath the adjacent margin of the blank.

A stripe of glue is applied by a suitable gluing roller 129 (Figure 12) carried by an arm 130 shaped as indicated at 131 for slidable movement along a rail 132 carried by the aforesaid frame member 18 and a suitable support 133. The gluing roller is moved backwards and forwards by means of suitable linkages, including a link 134 pivotally connected to the upper end of the arm 130 and also to the upper end of a longer link 135 in the shape of an H-bar (Figure 3). This link 135 is pivoted at an intermediate point 136 to a bracket 137 fixed to the frame of the machine. The lower end of this link is pivotally connected to a collar 138 slidable on a rod 139. The outer end of this rod is provided with a nut 140, and the collar 138 is normally urged against this nut by means of a spring 141 disposed between the slidable collar and a fixed collar 142, this structure providing a shock-absorbing take-up for any give caused by the straight reciprocatory movements of the arm 130 on the rail 132.

The other end of the rod 139 is fixed to a bifurcated member 143 having a substantially rectangular opening 144. The opening 144 is grooved to slidably accommodate a straight-sided block 145 floating on the cam shaft 30, and the bifurcated member reciprocates back and forth over the block. This reciprocatory movement is caused by a cam 146 fixed to the cam shaft 30 and provided with a suitable cam groove 147 in which a follower in the form of a roller 148 continuously rides. This follower is carried by the aforesaid bifurcated member 143. It will be noted that the cam groove is shaped for idling substantially three-quarters of a revolution, and the other one-quarter of a revolution is designed to move the rod 139 first to the left as viewed in Figure 12 and then to the right, thus causing the glue applying roller 129 to pass over the blank and return to original position.

A suitable glue pot 149 is mounted in a dovetail socket in a base member 150, so that the glue pot may be easily removed when desired for cleaning operations or other purposes. Inside the glue pot is a wheel 151 driven from the cam shaft 30 by a suitable sprocket wheel and chain connection 152. As seen in Figure 12, the wheel 151 bears against the applying roller 129 when the latter is in a position of rest, so that a new supply of glue is provided on the applying roller 129 between gluing operations.

Summarizing the operation of the gluing mechanism, it will be noted that when the blank is elevated to the lowermost dotted line position of Figure 13, and the punch die retracted, the backing plate 119 slides under the adjacent margin of the blank 1. Immediately thereafter, the glue roller 129, having received a supply of glue from the wheel 151 in the glue pot, passes over the upper surface of this margin of the blank and leaves a stripe of glue 6. In order to avoid removal or misplacement of any part of the stripe of glue, the various parts of the machine are so timed that the blank is raised by the initial blank holding means 118 to the upper dotted line position of Figure 13 before the glue applying roller 129 returns to its original position of rest. Consequently, on the return movement the roller 129 passes beneath the blank and so cannot again touch the previously applied stripe of glue.

It will be appreciated that it is not necessary to apply a continuous stripe of glue to the margin of a blank, if such a continuous stripe is not desired. By the simple expedient of providing the roller 129 with one or more notches on its outer edge, the glue may be distributed in spaced dabs along the blank margin. It will be further appreciated that the glue may be varied in character, depending upon whether the finished container is to be used as a drinking cup for holding a liquid, thus necessitating a tight seam, or as an ice cream cup, which requires glue of such amount and character as merely to hold the cup in shape but insufficient to preclude ready separation of the side margins of the cup when it is desired to strip it from its frozen contents.

*Initial blank-holding means*

The initial blank-holding means 118 are designed to carry the blank during the above described gluing operation, and immediately upon the application of the glue, elevate the blank to the upper dotted line position seen in Figure 13, thus bringing the blank into contact with the forming mandrel 33. At this time, the aforesaid cam bar 53 moves to the position seen in Figure 5, closing the jaw 44 upon the blank, and the blank is thereafter held by this jaw and by suction through the mandrel, if the latter is deemed necessary.

These initial blank-holding means are best seen in Figures 3, 9, 10, 11 and 13, with special reference to Figures 10 and 11. As generally indicated by the numeral 118—118, the holding means includes a pair of tubular members, each of a substantially U-shape, with the forward leg considerably shorter than the rear leg. These members 118 are both connected to a substantially V-shaped block 153 (Figures 9, 10 and 11) having a pair of converging passages 154 therein. One end of each passage communicates with the interior of one of the members 118 and the other end of the passage joins an end of the second passage, so that both passages together communicate with a suction line 155. With reference to Figure 1, it will be seen that this suction line also extends to the aforesaid control box 65, wherein the suction is automatically produced and cut off at the proper times by suitable mechanism within the box.

With reference specifically to Figure 11, it will be seen that each holding member 118 includes a tubular upright leg 156, the lower end of which is seated in the base 153 in communication with the respective passage 154, as indicated at 157. Seated on the upper end of this leg is a tubular horizontal leg 158 forming the yoke of the U, the forward portion of which is bent downwardly, as indicated at 159. Through a suitable port 160, communication is established between the legs 156 and 158. The part 159 terminates in a suitable suction disk 161 covered with an apertured face disk 162 of rubber or equivalent material. Obviously, therefore, when suction is applied through each of the elements 118, the blank 1 is firmly held against the face plate 162.

The passaged base 153 has a collar 163 on the underside thereof connected to the upper end of a rod 164 slidable within a guide cylinder 165 carried by the aforesaid guide member 110. The lower end of this rod 164 is pivotally connected to the free bifurcated end 166 of a crank arm 167 pivoted to the aforesaid stationary shaft 31 (Figures 3 and 10). This crank arm carries a cam follower in the nature of a roller 168 which rides a suitable groove in a cam 169 rotatable with the cam shaft 30. The groove in the cam 169 is shaped to provide an idling portion 170 (Figure 10) when the holding members 118 are in position for the blank to be pushed thereagainst by the punch die 103 as above described; a portion 171 which causes the holding member to raise slightly with the blank 1 and hold the same in this position during the above described gluing operation; and a portion 172 which results in raising the holding members to place the blank in contact with the forming mandrel and return the holding member to the idling position defined by the groove portions 170.

In the above manner, the holding members are successively raised in two steps and then returned to initial position, all in synchronization with the other parts of the machine.

Blank shaping mechanism

After the jaw 44 has gripped the blank to the mandrel and the holding means have released their suction hold upon the blank, the holding means may descend for another operation. The blank now is held by the mandrel jaw in the position seen in Figures 21, 22 and 23. The mandrel has not as yet started its forward movement, but it and the associated mechanism are in the position seen in Figure 5.

The mandrel shank is now moved forwardly by the action of the aforesaid twin cams 42—42, the blank being held against the mandrel in the position seen in Figure 23. During this forward movement, the roller 52 which actuates the jaw 44 will be riding along the lower level portion 62 of the cam bar 53 so that the jaw is held in closed position until the elevation 63 of the cam bar is reached.

It will be noted that the blank is moved forwardly with the smaller arcuate edge 3 in advance. After a short forward movement of the mandrel, the laterally projecting portions of the blank defined by the converging edges 4 and 5 contact a pair of spaced stationary rods 173—173 (Figures 1 and 24) and the blank is automatically partially folded around the mandrel to substantially the position seen in Figure 24. These rods 173—173 are each substantially of an inverted L-shape with a vertical leg and a horizontal leg in elevated position extending towards the finish end of the machine. With reference to Figure 1, it will be seen that these rods extend beyond the end of the shaping mechanism now about to be described, so that the blank is held in the position shown in Figure 24 during its entry into the shaping mechanism.

The shaping mechanism and its operating means may best be seen with reference to Figures 3, 14, 15, 16, 17, 24 and 25. With reference more specifically to Figures 24 and 25, this mechanism embodies a shoe 174 having a tapering socket 175 therein complemental to the side wall of the cup to be formed from the blank 1, the shoe being supported on the free end of a bell crank 176. Another similar shoe 177 is carried by the free end of a bell crank 178 and is disposed in confronting relationship with the shoe 174. Each of the bell cranks 176 and 178 is pivoted to a stationary shaft 179 carried by a suitable bracket 180 mounted on the bed plate 12 (Figures 14 and 17), the bell crank 176 having a journal 181 formed on the end thereof, and the bell crank 178 being bifurcated to form a pair of journals 182 straddling the journal 181.

The bell crank 176 is bifurcated in an intermediate portion to form a pair of opposed ears 183 which are pivoted to a hollow block 184 disposed between the ears. Through this block a bolt 185 extends, the lower end of which is pivoted as at 186 to a cross-head 187. The upper end of this bolt is provided with a pair of nuts or the equivalent 188 which bear against the hollow block 184 upon a downward movement of the cross-head to swing the respective shoe 174 to the open position seen in Figure 14. Between the block 184 and the cross-head 187 a coil spring 189 is disposed around the bolt 185, and when the cross-head is moved upwardly, the jaws move to the closed position seen in Figure 16 by virtue of the pressure of the spring 189, since the bolt 185 passes freely through the block 184.

The other bell crank 178 is similarly constructed, being provided with a pair of similar ears 190 pivoted to a hollow block 191, through which a bolt 192 extends, this bolt being connected to the cross-head 187 at one end and being provided with a pair of nuts or the equivalent 193 at the other end. A spring 194 encases the bolt and urges the respective shoe 177 into the closed position seen in Figure 16 when the cross-head is raised. It will be noted, however, that the bolt 192 is longer than the aforesaid bolt 185, so that upon the downward movement of the cross-head, the shoe 174 starts its movement toward open position prior to the shoe 177.

The cross-head is moved upwardly and downwardly by virtue of its attachment to one end of a plunger 195 slidable in a suitable flanged bearing 196 attached to the bed plate of the machine. The lower end of the plunger 195 is pivotally connected to the bifurcated end 197 of a crank 198, the opposite end of which pivots around the aforesaid stationary shaft 31 (Figures 3 and 14). Mounted on the cam shaft 30 adjacent the crank 198 is a cam 199 having a suitable cam groove 200 therein. A rider in the nature of a roller 201 carried by the crank 198 follows the cam groove and moves the free end of the crank accordingly. With reference to Figure 14, it will be seen that the major portion of the cam groove 200 is such as to maintain the crank idle, but this groove also has a portion 202 designed to elevate the crank, and thereby cause the respective shoes 174 and 177 to move into closed position. This portion 202 of the cam groove tapers off into the idling portion thereof in a manner to cause a relatively gradual opening of the shoes, which gradual opening occurs when the large end of the mandrel 33 passes between the smaller ends of the shoes.

The shoe 177 has associated therewith a wiper 203 disposed for edgewise contact with the blank on the mandrel. The purpose of this wiper is to flatten one side portion of the blank so that the other side portion may overlap the first portion to form the seam, as indicated in Figure 25. With reference to Figures 16 and 25, it will be seen that the wiper is carried on the end of a rod 204 slidable in a suitable bearing 205 carried by the shoe 177. The outer end of the rod 204 is provided with a fixed collar 206 and a coil spring 207 is disposed between this collar and the bearing 205, which spring constantly tends to urge the wiper into a position of rest as seen in Figures 14 and 16. A link 208 is pivoted at its ends respectively to the aforesaid collar 206 and to the upper end of a bell crank 209 pivoted at an intermediate point, as at 210, to one of the ears 190 of the bell crank 178. The other end 211 of the bell crank is free and projects outwardly over the end of a reciprocatory plunger 212 actuated through a link 213 by means of a lever 214 pivoted intermediately as at 215 to a suitable bracket 216 carried by the bed plate. Adjacent this lever, the cam shaft 30 carries a cam 217 having a notch 218 in its circumferential edge. The inner end of the lever 214 carries a follower in the nature of a roller 219 riding on the circumferential edge of the cam 217. Any suitable means, such as a tension spring 220, may be employed to keep the roller 219 in contact with the cam. When the roller falls within the notch 218, the plunger 212 is elevated, striking the end 211 of the bell crank 209, thus causing the wiper 203 to move inwardly over the blank carried on the mandrel, as indicated in Figure 25.

It will therefore be seen that as the mandrel is moved forwardly towards the discharge end of the machine, and as the mandrel is passing between the spaced rods 173—173, as indicated in Figure 4, the cross-head 187 is moved upwardly, thus permitting the springs 189 and 194 to move the shoes 174 and 177 to closed position. These shoes, when in closed position, do not actually contact each other, but merely move to directly confronting positions with a space therebetween. The mandrel passes between the shoes, separating them somewhat against the action of the springs 189 and 194 during the course of its travel. As the mandrel spreads the shoes, the plunger 212 is elevated, thus moving the wiper across a side portion of the blank, as indicated in Figure 25, to hold the margin of the blank adjacent the edge 4 in contact with the mandrel, and thus permit the margin adjacent the edge 5 carrying the adhesive stripe 6 to be folded down on top of the blank margin 4 as the mandrel progresses further between the shoes. As the larger end of the mandrel advances towards the smaller ends of the shoes, the shoes are slightly separated by virture of the portion 202 of the groove in the cam 199, and it will be noted that although the cross-head 187 descends slightly, there is still pressure of the springs 189 and 194 against the blank on the mandrel, and only the pressure of these springs.

It will be appreciated that the mandrel passing through the shoes forms the blank from the shape seen in Figure 24 into substantially a conical shape around the mandrel. Contemporaneously with the passage of the mandrel between the shoes, the cam wheel 56 rides upon the hump 63 of the cam bar 53 and moves the gripping jaw 44 into the intermediate position seen in Figures 6 and 17, to prevent this jaw from bumping the receiving mechanism contained in the aforesaid housing 20. The mandrel actually forces its way directly into the receiving mechanism, and the jaw 44, when in the half-open position, extends outwardly of the housing 20, as seen clearly in Figure 17. Of course, during the reverse movement of the mandrel, the jaw 44 remains in this half-open position until it has effectively cleared the receiving mechanism, when it is again moved to closed position against the mandrel temporarily until the wheel 52 again rides the higher hump 61 of the cam bar 53, thus moving the jaw to fully opened position for the reception of a new blank.

It will be appreciated that the entire forward movement of the mandrel and the consequent formation of a cup occupies only a fractional part of a second, and, of course, the blank-shaping mechanism together with the operating means therefor are timed in synchronization with the other parts of the machine.

Cup receiving means and its operation

The receiving mechanism includes a cylinder 221 mounted in any suitable manner to rotate inside the housing 20. This cylinder externally of the housing carries an integral angle gear 222 which is in mesh with another angle driving gear 223 (Figures 17 and 20) mounted on a shaft 224 carried in a suitable bearing bracket 225 on the bed plate of the machine. Rotation of the receiving cylinder 221 is caused by the intermittent rotation of the angle gear 223.

Fixed to the gear 223 is a ratchet 226 rotated by means of a pawl 227 pivoted as at 228 to one leg of a bell crank 229. The other leg of the bell crank is pivoted to the upper end of a reciprocatory rod 230, while the intermediate portion of the bell crank pivots on the aforesaid shaft 224.

A link 231 forms an intermediate pivotal connection between the lower end of the rod 230 and the outer end of a lever 232 pivoted at an intermediate point as at 233 to a suitable bracket 234 carried by the bed plate 12. The inner end of the lever carries a cam rider in the form of a roller 235 which rides the circumferential edge of a cam 236 carried by the aforesaid cam shaft 30 (Figures 3 and 20). Any suitable means, such as a tension spring 237 may be employed to keep the roller 235 in contact with the outer edge of the cam 236. This cam is so shaped as to periodically cause the rod 230 to be moved upwardly and downwardly to actuate the pawl 227 and thus cause an intermittent rotation of the receiving cylinder 221.

When the mandrel passes through the above described blank-shaping mechanism, the side seam 7 of the finished cup 1a seen in Figures 28, 29 and 30 is not sufficiently tight to enable the cup to contain a liquid without leakage, although it may be sufficient for the cup to be used for a frozen confection, such as ice cream. For drinking cups, however, it is necessary to insure a tight seam 7, especially in the apexial region of the cup, and with the present machine, this seam is effectively sealed throughout its length inside the receiving mechanism.

To this end, it will be noted, with reference to Figures 17 and 27, that the rear portion of the receiving cylinder 221 is of sufficient internal diameter to permit a finished cup 1a to fully expand at the mouth end thereof. However, in the forward end of this cylinder, a fixed sleeve 238 is inserted so that the diameter is reduced, thus holding the mouth end of the cup compressed, as indicated at 239. As before explained, the rear portion 34 of the mandrel is cylindrical and is not tapered, so that when the blank 1 is wound around the tapering portion 33 of the mandrel, the mouth edge of the cup will project outwardly beyond the portion 34, as indicated at 240, in Figure 27. This projecting edge portion is consequently compressed by the sleeve 238 when the cup is forced into this sleeve by the forward movement of the mandrel.

Of course, the cups are nested, one within the other, as clearly seen in Figure 17, in the receiving means, and therefore, a group of extremely tightly nested cups will be contained within the sleeve 238. This tightly compacted nest of cups functions as a mold for the next entering cup forced into position by the mandrel, and the seam 7 of the entering cup is effectively sealed to the very apex of the cup by being so compacted. As each cup is successively forced into the sleeve 239, another cup is forced out of the sleeve into the rear portion of the cylinder 221, where the mouth end of the cup may expand to the fullest extent, as seen clearly in the exploded showing of Figure 27, and thus the cups in the discharge part of the cylinder 221 are more loosely nested. The cups, of course, are subsequently pushed entirely out of the cylinder 221 and may fall into any suitable receiver in stacked relationship ready to be separated into properly numbered groups for packaging. Obviously, some form of counting mechanism is preferably employed to designate each cup of a certain number, so that the ultimate stack of finished cups may be readily divided for packaging. Such counting mechanisms are known in the art and no disclosure of them is needed herein.

The operation

In view of the foregoing individual descriptions of the functions and operations of the various component parts of the machine, it is only necessary at this point to briefly summarize the operation of the machine. In this summarization, of course, implied reference is had to the foregoing description.

It will be appreciated that the actual operation of severing a blank from a stock ribbon and forming this blank into a conical container requires only a fractional part of a second, and when it is understood that a plurality of mandrel units are preferably mounted in gang formation and operable from a single power source, it is apparent that the manufacture of paper cups from the present machine is indeed very rapid.

The stock ribbon is fed through the machine from a supply roll 14, and when the leading end of the ribbon overlies the cutting mechanism, the punch die 103 rises and severs a blank from the strip. The blank is elevated by the punch die, being held to the punch die by a vacuum therethrough, and brought into substantially immediate contact with the initial holding members 118—118, when the vacuum through the punch die is broken and the blank is retained by a vacuum through these holding members. These holding members raise the blank sufficiently to permit the plate 119 to slide beneath a margin of the blank and form a backing while the roller 129 rides across the blank and applies the stripe of glue 6. The holding members 118—118 then elevate the blank to a further extent and bring it into contact with the mandrel 33, the glue-applying roller 129 returning to its original position of rest beneath the raised blank.

When the blank is delivered to the forming mandrel, the suction is broken in the holding members 118—118, and the gripper jaw 44 clamps the blank against the mandrel, as seen in Figures 21, 22 and 23. The mandrel then starts its forward movement towards the discharge end of the machine, and the laterally extending portions of the blank are folded upwardly into the position seen in Figure 24 by means of the spaced rods 173—173. The mandrel then forces its way between the blank-shaping shoes 174 and 177, wherein the blank is formed around the mandrel, one of the side margins of the blank being held against the mandrel by the action of the wiper 203 while the other margin is brought into overlapping relationship and glued to the first margin, as seen in Figures 25 and 26.

Contemporaneously with the passage of the mandrel between the shoes 174 and 177, the gripper jaw 44 is moved to intermediate position, as illustrated in Figures 6 and 17, so that this jaw will clear the housing 20 of the receiving mechanism. A further onward movement of the mandrel forces the blank into a very tightly compacted nest of previously formed containers, thus making use of the compact nest of previously formed containers as a molding means to insure the proper adhesion of the overlapping margins forming the seam 7 in the finished cup 1a, so that the cup may be rendered liquid-tight in the event it is to be used as a drinking cup. After the deposition of each container in the compact nest of cups held by the sleeve 238, the receiving cylinder is rotated a partial revolution so as to bring the seams 7 of the stack of cups in staggered relationship relatively to each other and thus keep the stack in substantially uniform thickness throughout. As each successively shaped blank is forced into the sleeve 239, a finished container 1a is forced out of this sleeve into the cylinder 221, and likewise a cup is forced out of the cylinder 221 into whatever further receiving means may be provided.

Practically every moving part of the machine, with the exception of the mandrel, is driven from the cam shaft 30, and the twin cam which reciprocates the mandrel and its shank are carried on the shaft 26 which is connected through a suitable bevel gear arrangement with the obliquely disposed cam shaft 30. Consequently, it is not a too difficult matter to synchronize all of the cam arrangements so that the operations will follow each other in the proper sequential order.

From the foregoing, it is apparent that I have provided a novel cup making machine which, considering its function, is of relatively simple and economical construction and which is adapted to manufacture conical paper cups with a minimum waste of material and with the use of an exceedingly small amount of material consistent with the size of the cup made, in a most rapid, efficient and economical manner. The machine is durably constructed and requires little attention from an operator.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a container making machine, a reciprocatory forming element movable continuously in each direction between reversals of direction and capable of carrying a blank to be formed thereabout, and forming means movable into position to act on the blank carried by the forming element during its continuous movement in one direction, and means arranged to operate in timed relation to said element to retract certain of said forming means out of the way of said element on its return movement.

2. In a container making machine, a former capable of carrying a blank to be formed and movable along a predetermined path, stationary shaping means adjacent the path of the former, and resiliently held shaping means adjacent the path of the former to act on the blank as the former passes thereby, and receiving means into which said former delivers a shaped blank after passing by both said shaping means.

3. In a machine for forming conical paper cups, a conical former capable of carrying a flat unfolded blank to be formed and movable apex foremost along a predetermined path with the blank extending beyond each side of said former, and a pair of resiliently urged shaping members between and past which the former must pass and arranged to shape the projecting parts of the blank around the former as it passes by said members, and retracting means to hold said members out of the return path of said former.

4. In a container making machine, a conical former capable of carrying a blank and reciprocable along a path defined by its longitudinal axis, a pair of confronting blank shaping shoes each having a tapering cavity in keeping with the shape of the former and positioned so the former must pass therebetween, and retracting means arranged to remove said shoes from the path of said former on the return movement of the former.

5. In a container making machine, means for holding tightly compressed a plurality of nested formed containers, a former capable of carrying a blank and around which the blank may be formed with overlapping marginal portions adhesively held, said former being movable directly into the formed containers held by said means to complete the sealing of said overlapped portions, and means to rotate said first means after the delivery of each succeeding container to stagger the overlapped portions.

6. In a container making machine, means for holding tightly compressed a plurality of nested formed containers, a former capable of carrying a blank and around which the blank may be formed with overlapping marginal portions adhesively held, said former being movable directly into the formed containers held by said means to complete the sealing of said overlapped portions, and means to actuate the first said means upon the delivery of each succeeding container to stagger the overlapped portions and twist the newly formed container off the former.

7. In a container making machine, container receiving means having a front part wherein containers are held under compression and a rear part where containers are loosely held, and a former around which a blank is shaped into a container movable forcibly into said receiving means to deposit a newly formed container in the front part and force a preceding container into said rear part.

8. In a container making machine, a former movable along a predetermined path, a gripping means to hold a blank on said former and movable with said former, and cam means including actuating regions of different depths and predetermined lengths arranged to actuate said gripping means successively through a plurality of closed and partially open positions other than its original full open position during the course of travel of said former and hold said gripping means in each position a predetermined length of time.

9. In a machine for forming a conical container out of a single blank of material, a reciprocable but non-rotatable conical former, mechanical gripping means associated with said former and movable therewith to hold an intermediate part of a blank on the former, and shaping means to shape the lateral parts of said blank around the former.

10. In a machine for forming a conical container out of a single blank of material, a conical former stationary with respect to its own axis, both mechanical and pneumatic means associated with said former to hold an intermediate part of a blank on the former, means for applying adhesive adjacent a margin of the blank, shaping means to shape the lateral parts of the blank around said former, and wiping means to tuck one marginal portion beneath another, said marginal portions being held by said adhesive.

11. In a container making machine, a reciprocable shank, a former on the end of said shank, gripper mechanism carried by said shank for holding a blank on said former, and cam means disposed adjacent the path of said shank and over which a portion of said mechanism rides to successively actuate said mechanism.

12. In a container making machine, an elongated member reciprocable longitudinally, a former carried by said member, blank holding mechanism for holding a blank on said former movable with said member, and a cam bar adjacent said member over which a part of said mechanism rides to actuate said mechanism, said cam bar being movable relatively to said member to initially actuate said mechanism.

13. In a container making machine, container receiving means, a former movable directly into said receiving means, a gripper jaw associated with said former to hold a blank on the former, and control means to move said jaw into open position to clear said receiving means when said former enters the same.

14. In a container making machine, container receiving means, a former reciprocable along a predetermined path into and out of said receiving means, a gripper jaw associated with said former to hold a blank thereon, blank shaping means along the path of said former, and actuating means arranged to fully open said jaw initially, close the jaw over a blank, and open said jaw only partially to permit it to clear said shaping and receiving means.

15. In a container making machine, means for feeding a stock ribbon, suction holding cutting means to sever a container blank from said ribbon, a former spaced above said cutting means, and suction holding elevating means to raise the severed blank to said former.

16. In a container making machine, means for feeding a stock ribbon, cutting means to sever a container blank from said ribbon, a former spaced above said cutting means, elevating means to raise the blank to said former, and gluing means operable to apply glue to the blank while the blank is held by said elevating means.

17. In a container making machine, blank holding means, feeding means to advance a stock ribbon, cutting means arranged to sever a container blank from said ribbon and move the severed blank to said holding means, and vacuum producing means associated with said cutting means to create a suction therethrough to keep said blank in proper position until it reaches said holding means.

18. In a container making machine, feeding means for advancing a ribbon of stock, blank holding means disposed above said ribbon, and suction holding cutting means disposed below said ribbon and operable to sever a container blank from said ribbon and raise the same to said holding means.

19. In a container making machine, feeding means for advancing a ribbon of stock, blank holding means disposed above said ribbon, cutting means disposed below said ribbon and operable to sever a container blank from said ribbon and raise the same to said holding means, and means to create a suction through said cutting means to keep said blank in proper position until it reaches said holding means.

20. In a container making machine, feeding means to advance a strip of stock, blank holding means, a cutting die having a hollow in the top thereof arranged to sever a blank from said strip and move it to said holding means, and means to create a suction in said hollow to hold said blank firmly on said die until it reaches said holding means.

21. In a container making machine, feeding means to advance a strip of stock, cutting means to sever a blank from said strip, a former, glue applying means, and holding means arranged to receive a blank from said cutting means, hold said blank while said glue applying means operates, and then deliver the blank to said former.

22. In a container making machine, a former arranged to follow a predetermined path defined by its longitudinal axis, mechanical gripping means carried by said former to grip a blank, and means associated with said former to produce a suction therein to hold a blank thereon.

23. In a container making machine, container receiving means for holding shaped containers in nested relationship, a reciprocable former movable from a position of rest into said receiving means and back along a straight path, means to deliver a glued blank into engagement with said former while the latter is in the position of rest, blank shaping means in the path of said former, and means to reciprocate said former carrying the blank therewith.

24. In a container making machine, container receiving means, a reciprocable former movable from a position of rest to said receiving means and back along a straight path, means to deliver a glued blank to said former while the latter is in the position of rest, blank shaping means in the path of said former, means to reciprocate said former carrying the blank therewith, and means to retract said shaping means from the path of said former when the latter returns to the said position of rest.

25. In a container making machine, a reciprocable former, mechanism for reciprocating the same with stops only at the ends of its path, a cam shaft, a series of cams thereon, stock feeding means, blank cutting means, delivery means to transport a cut blank to said former, shaping means movable into and out of the path of said former to shape the blank therearound, and rotatable blank receiving means, all said means being actuated by a cam on said shaft.

26. In a container making machine, a reciprocable former, mechanism for reciprocating the same with stops only at the ends of its path, a cam shaft, a series of cams thereon, stock feeding means, blank cutting means, delivery means to transport a cut blank to said former, gluing means arranged to apply adhesive to said blank while the same is held by said delivery means, shaping means movable into and out of the path of said former to shape the blank therearound, and rotatable blank receiving means, all said means being actuated by a cam on said shaft.

27. In a container making machine, container receiving means for holding shaped containers in nested relationship, a former movable along a path from an initial position into said receiving means to forcibly jam a container into nested engagement with previously formed containers to complete the forming of the new container, means to deliver a blank to said former to be carried thereby, and shaping means disposed along the path of said former to act on the carried blank as said former passes by said shaping means.

28. In a conical paper cup making machine, receiving means for holding previously shaped cups in nested relationship under compression, a conical former capable of carrying a blank to be formed and movable along a predetermined path, shaping means adjacent said path to act on a blank carried by said former and shape the blank into a nearly complete conical cup about said former, and actuating means to move the former along said path and forcibly jam the former and cup being acted upon into said receiving means and the cups therein to complete the shaping of the apexial region of the new cup and close it watertight.

29. In a conical paper cup making machine, receiving means for holding previously shaped cups in nested relationship under compression, a conical former capable of carrying a blank to be formed and movable along a predetermined path, shaping means adjacent said path to act on a blank carried by said former and shape the blank into a nearly complete conical cup about said former, actuating means to move the former along said path and forcibly jam the former and cup being acted upon into said receiving means and the cups therein to complete the shaping of the apexial region of the new cup and close it watertight, and means to cause a rotation of said receiving means and the cups therein to twist each nearly shaped cup off the former.

30. In a machine for making conical paper cups, a former movable along a predetermined path, means for delivering a substantially sector-shaped blank to said former, gluing means to apply adhesive to a side margin of said blank, shaping means to shape the blank around said former into a container with overlapping margins held by said adhesive, receiving means arranged to hold previously shaped cups in nested relationship under compression, and actuating means to forcibly move said former and the partially complete cup thereon into said receiving means to nest the new cup forcibly in the cup under compression to close and seal the apex of the new cup.

31. In a conical cup making machine, a former, blank holding means below said former and movable to elevate the blank to said former, feeding means below said holding means to advance a ribbon of stock, cutting means to sever a blank from said ribbon and move the severed blank to said holding means, and gluing means arranged to apply adhesive to the blank while the blank is supported by said holding means.

32. In a conical cup making machine, a former, blank holding means below said former and movable to elevate the blank to said former, feeding means below said holding means to advance a ribbon of stock, cutting means to sever a blank from said ribbon and move the severed blank to said holding means, a backing member movable behind a portion of the blank while the blank is supported by said holding means, and a glue applicator ridable over the blank opposite said backing member to apply adhesive to the blank before the blank is delivered to said former.

33. In a container making machine, a former, blank supply means below said former, holding means to engage a blank and elevate it to said former, backing means movable adjacent a free portion of the blank while the blank is supported by said holding means, glue applying means operable on said blank opposite said backing means prior to delivery of the blank to said former, and means to shape the blank about said former into a container.

34. In a container making machine, a former capable of carrying a blank and movable in the direction of its longitudinal axis along a predetermined path, resiliently biased shaping means along the path of the former to shape the blank intimately around the former into a general shape defined by the contour of the former, and cup receiving means holding a plurality of nested formed containers under compression against full expansion at the mouth ends, said former forcing each shaped blank directly into said receiving means and said formed containers to complete the shaping of the blank.

35. In a conical cup making machine, a conical former capable of carrying a blank and movable point first along a predetermined path, shaping means along the path of the former to shape the blank around the former into conical shape generally defined by the contour of the former, receiving means arranged to hold previously shaped and nested containers under compression against full expansion at the mouth ends, and actuating means to force said former into said receiving means to wedge the carried blank into the shaped containers under compression and insure the newly shaped blank being watertight.

36. In a container making machine, a former capable of carrying a blank and movable along a predetermined path, means for delivering a blank having adhesive adjacent a margin to said former, shaping means along the path of said former arranged to shape the blank around the former with overlapped marginal portions held by said adhesive, receiving means holding a plurality of nested formed containers under compression against full lateral expansion, and means for driving said former into said nested containers to complete the sealing of the margins of the blank carried by the former.

37. In a container making machine, a former, means for engaging an intermediate portion of a blank and deliver the blank to said former, a backing member movable behind a free portion of the blank during delivery of the blank to the former, glue applying means movable over the blank opposite said backing member, and mechanism to cause the blank to be shaped into a container about said former.

38. In a container making machine, a former, delivery means arranged to engage a part of a blank and carry the blank to said former, means to cause said delivery means to hesitate during delivery of the blank, a backing member movable behind a free portion of the blank during the hesitation of said delivery means, glue applying means ridable over the blank opposite said backing member, and mechanism to cause the blank to be shaped about the former after the delivery operation is completed.

39. In a container making machine, a former, delivery means arranged to engage a part of a blank and carry the blank to said former, means to cause said delivery means to hesitate during delivery of the blank, a backing member movable behind a free portion of the blank during the hesitation of said delivery means, glue applying means ridable over the blank opposite said backing member, said delivery means completing the delivery of the blank to said former before the return movement of said glue applying means.

40. In a container making machine, a former, suction delivery means arranged to engage a blank in an intermediate position and carry the blank through the air to the former, glue applying means operable to apply glue to a free portion of the blank during the travel of the blank to said former, and mechanism arranged to cause a shaping of the blank around said former with overlapped portions held by the applied glue, a cup receiver arranged to hold previously formed and nested containers under compression against full lateral expansion, and driving means to force said former into the nested containers under compression to deposit the newly shaped container under such compression until the glue sets.

41. In a container making machine, container receiving means having a front part wherein containers are held under compression and a rear part where containers are loosely held, and a former around which a blank is shaped into a container movable forcibly into said receiving means to deposit a newly formed container in the front part and force a preceding container into said rear part, and mechanism for rotating said receiving means upon the arrival of the former to twist the newly formed container off the former.

42. In a machine for forming conical paper cups, a former capable of carrying a blank to be formed and movable apex foremost along a predetermined path, shaping members along said path to shape the blank around said former as the former passes by, and a receiving chute to hold a stack of formed and nested cups, said former being arranged to carry said blank by said shaping members and on directly into said chute into nested engagement with previously received cups.

43. In a container making machine, a reciprocatory former, a gripper jaw movable with said former and capable of holding a blank on said former, and cam means controlling the action of said gripper jaw for successively moving the jaw to fully open position, closed position, and partially open position as the former moves in one direction.

HERMAN CAREW.